United States Patent
Takahashi

(10) Patent No.: US 10,168,465 B2
(45) Date of Patent: Jan. 1, 2019

(54) ILLUMINATING APPARATUS, VEHICLE HEADLAMP AND CONTROL SYSTEM OF VEHICLE HEADLAMP

(71) Applicant: Sharp Kabushiki Kaisha, Osaka-shi, Osaka (JP)

(72) Inventor: Koji Takahashi, Osaka (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 14/705,030

(22) Filed: May 6, 2015

(65) Prior Publication Data

US 2015/0375672 A1 Dec. 31, 2015

(30) Foreign Application Priority Data

Jun. 27, 2014 (JP) .................. 2014-133302

(51) Int. Cl.
*G02B 6/00* (2006.01)
*F21V 8/00* (2006.01)
(Continued)

(52) U.S. Cl.
CPC ............ *G02B 6/0068* (2013.01); *F21S 41/14* (2018.01); *F21S 41/16* (2018.01); *F21S 41/25* (2018.01);
(Continued)

(58) Field of Classification Search
CPC ............... F21S 48/1241; F21S 48/1159; F21S 48/1388; F21S 48/1154; F21S 48/1136; F21S 48/17; F21S 48/10; F21S 48/1131; F21S 48/1145; F21S 48/1757; F21S 48/125; F21S 48/115; G02B 6/0028; G02B 6/0068; G02B 26/02; B60Q 1/0011; B60Q 1/04; B60Q 1/2696; B60Q 2300/054; B60Q 2300/45; B60Q 2400/50
See application file for complete search history.

(56) References Cited

U.S. PATENT DOCUMENTS 8,884,529 B2 * 11/2014 Huang ................ F21V 23/0457
  315/118
2004/0257827 A1 * 12/2004 Ishida .................. F21S 48/1154
  362/545

(Continued)

FOREIGN PATENT DOCUMENTS

JP 2008-143510 A 6/2008
JP 2011-222260 A 11/2011
(Continued)

OTHER PUBLICATIONS

English Abstract of JP 2014-007093 (A) published on Jan. 16, 2014.
(Continued)

*Primary Examiner* — Jason Holloway
(74) *Attorney, Agent, or Firm* — Keating & Bennett, LLP

(57) ABSTRACT

An illuminating apparatus includes a first light source that emits blue laser light, a light emitting section that emits light by being irradiated with the blue laser light, a second light source that emits green laser light, a biaxial MEMS scanner that irradiates a part of the light emitting section with the green laser light, and a convex lens that projects the light emitted from the light emitting section to the outside.

20 Claims, 14 Drawing Sheets

(51) Int. Cl.
  *F21S 41/14* (2018.01)
  *F21S 41/25* (2018.01)
  *F21S 41/675* (2018.01)
  *F21S 41/16* (2018.01)
  *F21S 41/141* (2018.01)
  *F21S 41/24* (2018.01)

(52) U.S. Cl.
  CPC ........ *F21S 41/675* (2018.01); *B60Q 2300/45* (2013.01); *B60Q 2400/50* (2013.01); *F21S 41/141* (2018.01); *F21S 41/24* (2018.01)

(56) References Cited

U.S. PATENT DOCUMENTS

| | | | | |
|---|---|---|---|---|
| 2005/0146889 | A1* | 7/2005 | Dunn | B60Q 1/04 362/543 |
| 2006/0238368 | A1* | 10/2006 | Pederson | B60Q 1/2611 340/815.45 |
| 2007/0263404 | A1* | 11/2007 | Yatsuda | F21S 48/1154 362/545 |
| 2008/0175012 | A1 | 7/2008 | Shimaoka et al. | |
| 2009/0097268 | A1* | 4/2009 | Mochizuki | F21S 48/1159 362/538 |
| 2011/0194302 | A1* | 8/2011 | Kishimoto | F21S 48/1154 362/511 |
| 2011/0279039 | A1* | 11/2011 | Kishimoto | H05B 33/0857 315/113 |
| 2011/0280039 | A1* | 11/2011 | Kishimoto | B60Q 1/0011 362/554 |
| 2012/0008098 | A1* | 1/2012 | Akiyama | G02B 19/0057 353/30 |
| 2012/0236536 | A1 | 9/2012 | Harada | |
| 2013/0027964 | A1* | 1/2013 | Toyota | G02B 6/0008 362/554 |
| 2013/0265561 | A1* | 10/2013 | Takahira | F21V 7/06 356/3 |
| 2014/0003074 | A1* | 1/2014 | Kishimoto | C09K 11/0883 362/510 |
| 2015/0062943 | A1* | 3/2015 | Takahira | F21S 48/1225 362/510 |

FOREIGN PATENT DOCUMENTS

| | | |
|---|---|---|
| JP | 2012-195253 A | 10/2012 |
| JP | 2013-026162 A | 2/2013 |
| JP | 2013-103628 A | 5/2013 |
| JP | 2014-7093 A | 1/2014 |
| JP | 2014-017094 A | 1/2014 |
| JP | 2014-49369 A | 3/2014 |

OTHER PUBLICATIONS

English Abstract of JP 2014-049369 (A) published on Mar. 17, 2014.

* cited by examiner

— · — · — LASER LIGHT (BLUE LASER) FOR EXCITING PHOSPHOR
— — — — WHITE LIGHT EMITTED FROM LIGHT EMITTING SECTION (MIXED YELLOW FLUORESCENCE WITH BLUE OF BLUE LASER)
— · · — · · LASER LIGHT (GREEN LASER) FOR DRAWING FIGURE

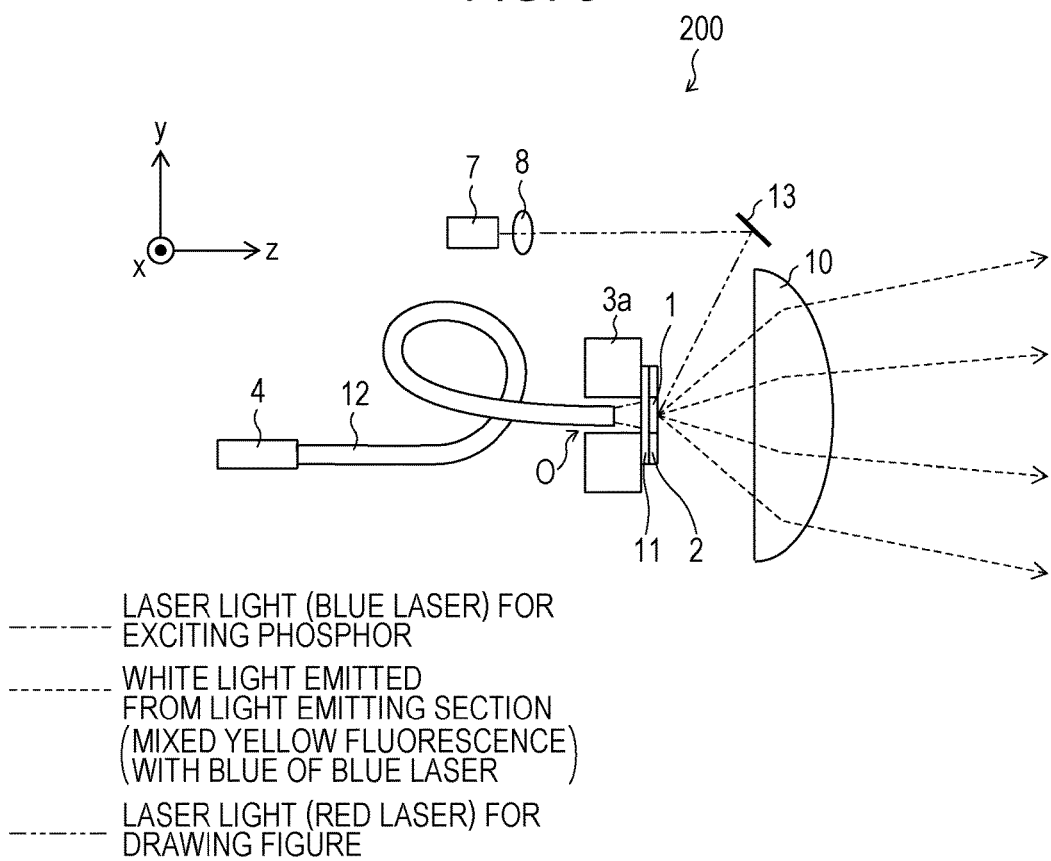

FIG. 4A
FIG. 4C
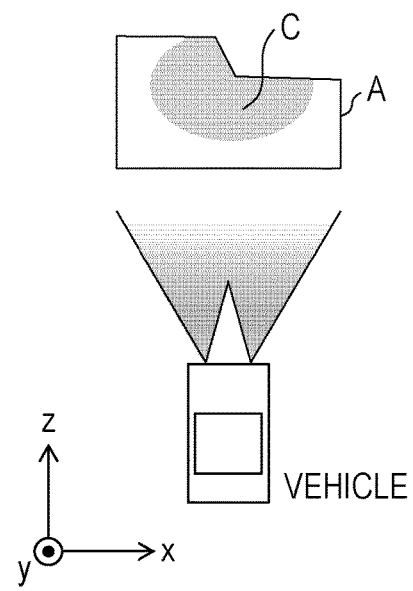
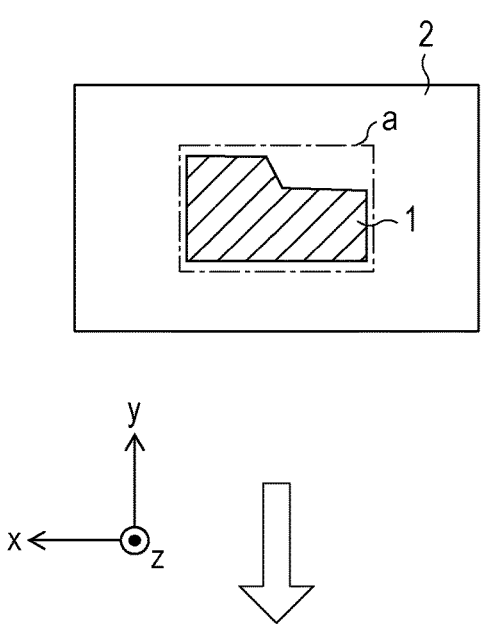
FIG. 4B
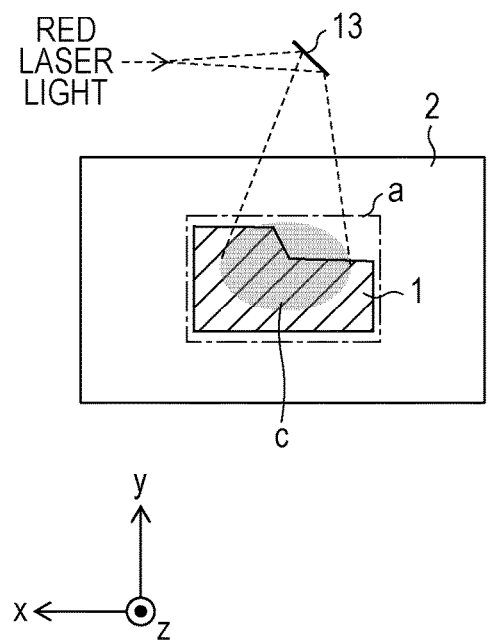

·········· WHITE LIGHT EMITTED FROM WHITE LED
(MIXED YELLOW FLUORESCENCE
WITH BLUE LIGHT OF BLUE LED)

—·—·— LASER LIGHT (GREEN LASER) FOR
DRAWING FIGURE

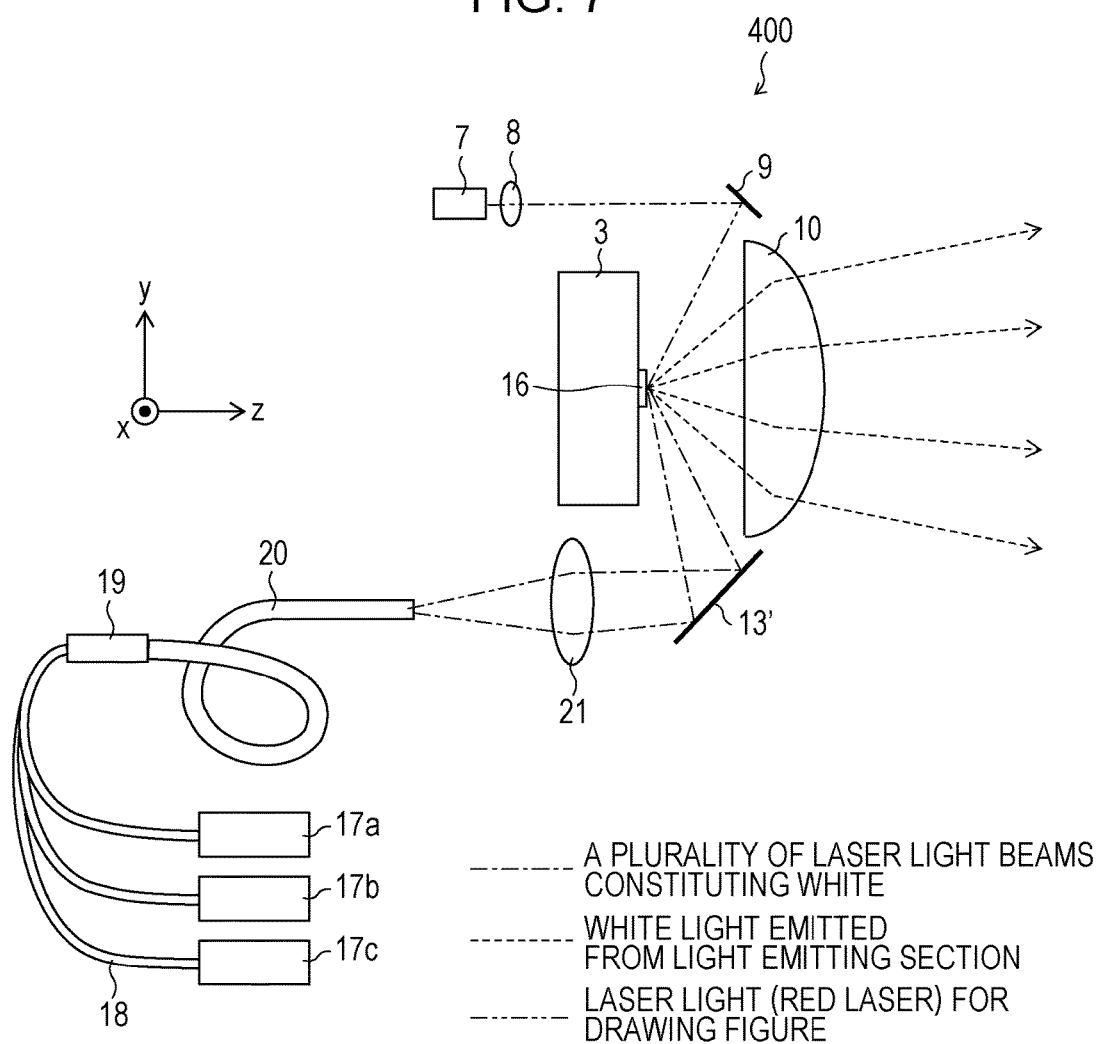

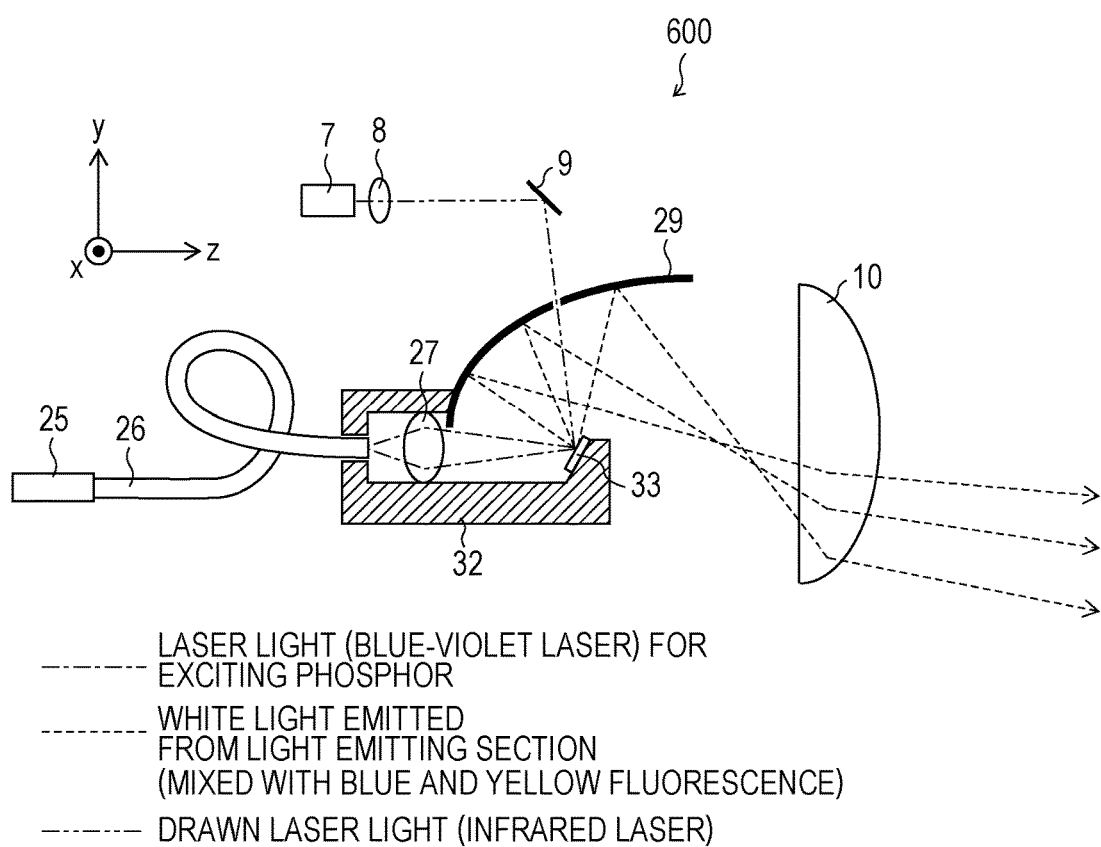

FIG. 12A
FIG. 12C
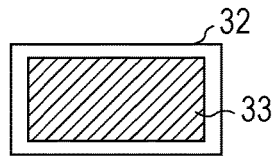
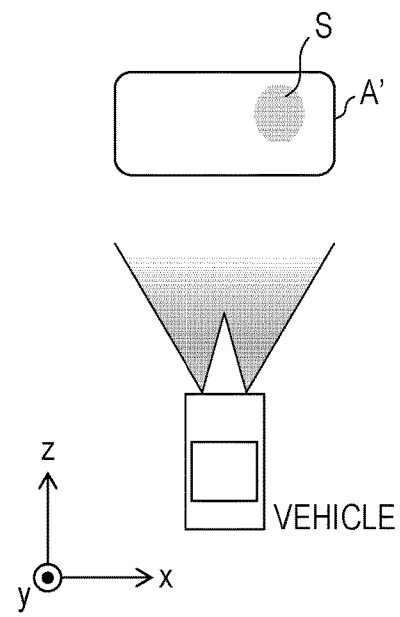
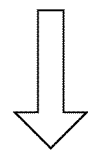
FIG. 12B
FIG. 12D
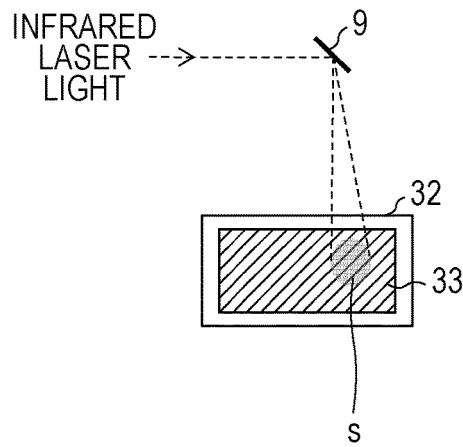
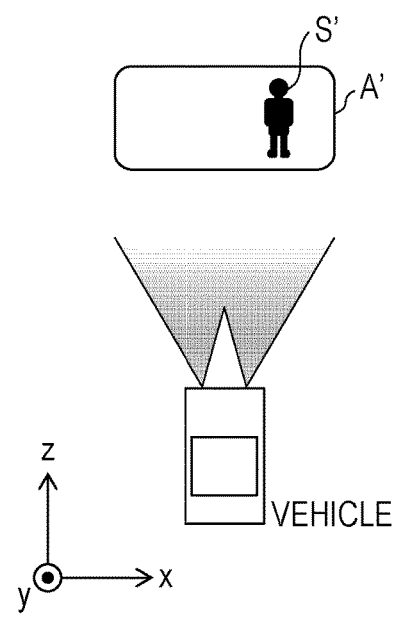

ILLUMINATING APPARATUS, VEHICLE HEADLAMP AND CONTROL SYSTEM OF VEHICLE HEADLAMP

BACKGROUND

1. Field

The present disclosure relates to an illuminating apparatus that projects light emitted from a light emitting section to the outside, a vehicle headlamp including the illuminating apparatus, and a control system for controlling the vehicle headlamp.

2. Description of the Related Art

Recently, following development of an illuminating lamp which simply radiates only white light, an illumination lamp has been developed in which the illuminating lamp includes information in the illumination light or changes color of the entirety or a portion of a projection pattern of the illumination light. Particularly, it is considered that loading some information in the illumination light adds value, important for the lumination industry. In addition, in the case of a vehicle headlamp, including more information in the illumination light can contribute to vehicle and pedestrian safety by reducing the likelihood of an accident at night.

As described above, as an example of the related art in which the illumination light has a function of transferring information or displaying information, a technology is disclosed in Japanese Unexamined Patent Application Publication No. 2013-103628 (published on May 30, 2013). In the technology, since a road surface of a region where the vehicle is predicted to travel by a laser projector installed separately from the headlamp, is irradiated with, for example, yellow-green light, and the pedestrian recognizes reaching of the vehicle.

In addition, as another example of a technology which is different from the technology in the related art described above, a technology is disclosed in Japanese Unexamined Patent Application Publication No. 2014-7093 (published on Jan. 16, 2014). In the technology, in the headlamp which images a light emitting pattern of a phosphor emission section projects a projection pattern on the road surface, a light emitting distribution is formed inside of the light emitting section as a specific graphic shape by exciting the phosphor light emitting section with a plurality of excitation light sources arranged in a matrix shape and increasing outputting of a part of the excitation light source so that the specific graphic is imaged on the road surface.

In addition, as an example of a technology in the related art described above, a projection apparatus is disclosed in Japanese Unexamined Patent Application Publication No. 2014-49369 (published on Mar. 17, 2014). In the projection apparatus, an excitation light source emitting excitation light, a near infrared light source emitting near infrared light and a wavelength switching member that switches the excitation light to another light having a different wavelength while being irradiated with the excitation light and the near infrared light are included. In addition, in the projection apparatus, visible light and infrared light coincide with each other by making an irradiation region of the excitation light and an irradiation region of the near infrared light coincide with each other in the wavelength switching member.

However, in the related art, there is a problem related to visibility of the information loaded in the illumination light.

For example, in the technology disclosed in Japanese Unexamined Patent Application Publication No. 2013-103628, there is a problem in the safety of laser light in that a laser projector of a laser light scan type radiates collimated laser light to the road surface. In addition, in the technology disclosed in Japanese Unexamined Patent Application Publication No. 2013-103628, visibility of the information loaded in the illumination light is not improved because output of laser light is difficult to be raised and brightened by regulation thereof.

In addition, in the technology disclosed in Japanese Unexamined Patent Application Publication No. 2014-7093 as described above, since a color of a figure as the information loaded in the illumination light is mainly white light of the illumination light, there is room for improving the visibility of the figure.

In addition, in the technology disclosed in Japanese Unexamined Patent Application Publication No. 2014-49369, since a projection region of the visible light and a projection region of the infrared light coincide with each other, there is a problem regarding visibility of the infrared light as information loaded in the visible light.

SUMMARY

The disclosure is made considering the above problems, and it is desirable to provide an illuminating apparatus which is capable of improving the visibility of the information loaded on illumination light.

According to an aspect of the disclosure, there is provided an illuminating apparatus including: a first light source that emits first light; a light emitting section that emits light by being irradiated with the first light; a second light source that emits second light which is infrared light or visible light having a different spectrum from an emission spectrum of light emitted from the light emitting section by being irradiated with the first light; a light radiating section that irradiates a part of the light emitting section with the second light; and a light projection section that projects light which is emitted from the light emitting section by being irradiated with the first light and light which is emitted from the light emitting section by being irradiated with the second light to the outside.

BRIEF DESCRIPTION OF THE DRAWINGS

FIG. 1A depicts an outline configuration of the illuminating apparatus, and FIG. 1B depicts an outline configuration of a biaxial MEMS scanner included in the illuminating apparatus;

FIG. 2A is a view illustrating the irradiation position of the laser light in the light emitting section when not drawing with green laser light, FIG. 2B is a view illustrating the irradiation position of the laser light in the light emitting section when drawing with green laser light, FIG. 2C is a view illustrating an example of the projection pattern of the illuminating apparatus, and FIG. 2D is a view illustrating another example of the projection pattern of the illuminating apparatus;

FIG. 3 is a view illustrating an outline configuration of an illuminating apparatus according to a second embodiment of the disclosure;

FIGS. 4A to 4C are views illustrating an irradiation position of laser light in the light emitting section and a specific example of a projection pattern of the illuminating apparatus, FIG. 4A is a view illustrating the irradiation position of the laser light in the light emitting section when being irradiated without red laser light, FIG. 4B is a view illustrating the irradiation position of the laser light in the light emitting section when being irradiated with red laser light, and FIG. 4C is a view illustrating an example of the projection pattern of the illuminating apparatus;

FIG. 6A is a view illustrating the irradiation position of the laser light in the light emitting section when being irradiated without green laser light, FIG. 6B is a view illustrating the irradiation position of the laser light in the light emitting section when being irradiated with the green laser light, FIG. 6C is a view illustrating an example of the projection pattern of the illuminating apparatus, and FIG. 6D is a view illustrating another example of the projection pattern of the illuminating apparatus;

FIG. 7 is a view illustrating an outline configuration of an illuminating apparatus according to a fourth embodiment of the disclosure;

FIG. 8A is a view illustrating the irradiation position of the laser light in the light emitting section when being irradiated without red laser light, FIG. 8B is a view illustrating the irradiation position of the laser light in the light emitting section when being irradiated with the red laser light, FIG. 8C is a view illustrating an example of the projection pattern of the illuminating apparatus, and FIG. 8D is a view illustrating another example of the projection pattern of the illuminating apparatus;

FIG. 10A is a view illustrating the irradiation position of the laser light in the light emitting section when being irradiated without red laser light, FIG. 10B is a view illustrating the irradiation position of the laser light in the light emitting section when being irradiated with the red laser light, and FIG. 10C is a view illustrating an example of the projection pattern of the illuminating apparatus;

FIG. 11 is a view illustrating an outline configuration of an illuminating apparatus according to a sixth embodiment of the disclosure;

FIGS. 12A to 12D are views illustrating an irradiation position of laser light in the light emitting section and a specific example of a projection pattern of the illuminating apparatus, FIG. 12A is a view illustrating the irradiation position of the laser light in the light emitting section when being irradiated without red laser light, FIG. 12B is a view illustrating the irradiation position of the laser light in the light emitting section when being irradiated with the red laser light, FIG. 12C is a view illustrating an example of the projection pattern of the illuminating apparatus, and FIG. 12D is a view illustrating another example of the projection pattern of the illuminating apparatus;

DESCRIPTION OF THE EMBODIMENTS

An embodiment of the disclosure will be described as follows based on FIGS. 1A to 14. Hereinafter, for convenience of description, in a configuration having the same configuration as described in a certain embodiment, the same numeral is given thereto, and a detailed description thereof may be omitted.

First Embodiment

Figure 1A:
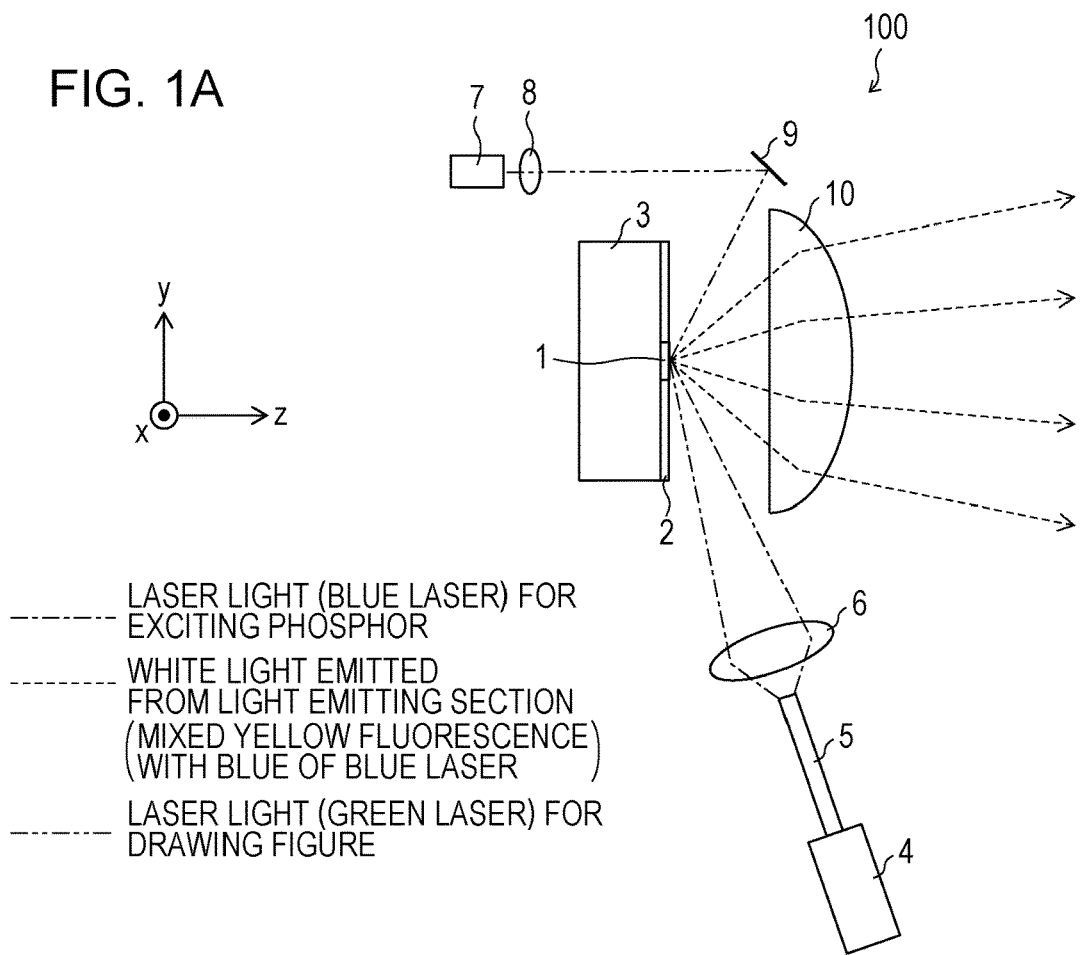
FIGS. 1A and 1B are views illustrating an illuminating apparatus according to a first embodiment of the disclosure.
Figure 1B:
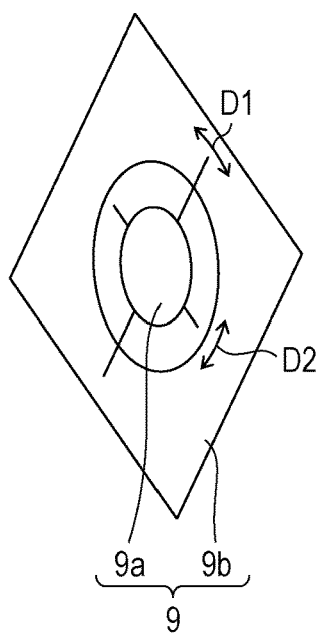

FIGS. 1A and 1B are views illustrating an illuminating apparatus 100 according to a first embodiment. FIG. 1A illustrates an outline configuration of the illuminating apparatus 100. The illuminating apparatus 100 has a configuration in which a surface on which excitation light to a light emitting section is irradiated coincides with a surface from which illumination light is mainly taken out, and hereinafter, the illuminating apparatus is referred to as a reflection type illuminating apparatus. A figure (arrow or number) is scanned and is drawn (communicates with a car navigation system or a speedometer described later) on a surface of the light emitting section 1 described later with green laser light. As illustrated in the drawing, the illuminating apparatus 100 includes a light emitting section 1, a light absorbing material 2, a support base 3, a first light source 4, a light guide member 5, an imaging lens 6, a second light source 7, a lens 8, a biaxial MEMS scanner (the light radiating section) 9, and a convex lens (light projection section) 10. In addition, in each drawing referred to hereinafter, an x axis direction corresponds to a horizontal direction. In addition, a y axis and a z axis are respectively orthogonal axes forming a surface perpendicular to the x axis direction.

Light Emitting Section 1

The light emitting section 1 contains a phosphor. The phosphor contained in the light emitting section 1 in the embodiment is an yttrium aluminum garnet phosphor ($Y_2Al_5O_{12}:Ce^{3+}$; in general, referred to as a YAG phosphor) which is excited by blue laser and emits yellow light; however, the phosphor is not limited thereto, and it may use other inorganic phosphors. In addition, the light emitting section 1 of the embodiment is a section in which a phosphor powder of the YAG phosphor is sintered and attached to the support base 3. The light emitting section 1 emits white light which is a mixed color of yellow fluorescence of the YAG phosphor and the blue laser scattered on a surface of the light emitting section 1. In addition, a shape, or the like of the light emitting section 1 will be described later.

Light Absorbing Material 2

The light absorbing material 2 is a member that has a characteristic of absorbing the radiated blue laser light. The light absorbing material 2 is formed around a peripheral edge of the light emitting section 1.

Support Base 3

The support base 3 supports the light emitting section 1 attaching a rear surface of the light emitting section 1 to the surface thereof. The support base 3 is preferably formed of a material which reflects the fluorescence emitted by the light emitting section 1 at high reflectance. The support base 3 is preferably formed of a metal such as aluminum. According to the above configuration, the support base 3 can reflect white light emitted from the rear surface side of the light emitting section 1, that is, a surface side in which the light emitting section 1 and the support base 3 are in contact with each other, to the convex lens 10 side. In addition, the support base 3 may be formed of a material which is not a metal such as high thermal conductive ceramics. In the case of this configuration, heat generated in the light emitting section 1 due to the energy of the blue laser light can be released through the support base 3.

First Light Source 4

The first light source 4 is a semiconductor laser element that emits the excitation light exciting the YAG phosphor contained in the light emitting section 1. Specifically, the first light source 4 emits the blue laser light (first light) with 405 nm wavelength and 5 W of output. The first light source 4 is mounted in a heat sink for radiating heat (not illustrated), and is coupled to a power source circuit for driving (not illustrated). An emitting end surface of the first light source 4 is butt-jointed with an incident end surface of the light guide member 5. In addition, as the first light source 4 of the embodiment, the semiconductor laser element is used; however, it is not limited thereto, and a semiconductor light emitting element such as a LED (light emitting device) may be used.

Light Guide Member 5

The light guide member 5 is a light guide member having a light guide region in which a cross-section of a short direction is a rectangular shape, and in the embodiment, a glass type rod lens. The light guide member 5 guides the received blue laser light by the first light source 4 toward a direction of the surface of the light emitting section 1. In more detail, the light guide member 5 guides the received blue laser light by the first light source 4 so that the blue laser light is obliquely incident on the surface of the light emitting section 1. An input surface of the light guide member 5 is directly bonded to the emitting end surface of the first light source 4 by butt-jointing.

Imaging Lens 6

The imaging lens 6 is the convex lens disposed between the light guide member 5 and the light emitting section 1. The imaging lens 6 sets an image forming surface of a near field pattern of the blue laser light generated to be on the emitting end surface of the light guide member 5. The imaging lens 6 is formed of, for example, glass. The blue laser light passes through the imaging lens 6 and is incident on a surface of the light emitting section 1. Accordingly, the blue laser light can be radiated on the light emitting section 1 with a uniform light distribution in a shape of the emitting end surface of the light guide member 5.

Second Light Source 7

The second light source 7 is a semiconductor laser element that emits the green laser light (second light) which does not contribute to the excitation of the YAG phosphor contained in the light emitting section 1. Specifically, the second light source 7 emits the green laser light with 530 nm wavelength and 0.1 W of output. The second light source 7 is mounted in the heat sink for radiating heat (not illustrated) and is coupled to the power source circuit for driving (not illustrated). In addition, as the second light source 7 of the embodiment, the semiconductor laser element is used; however, it is not limited thereto, and the semiconductor light emitting element such as the LED may be used.

Lens 8

The lens 8 is a so called collimate lens, and is an optical member that makes the green laser light emitted from the second light source 7 be parallel light incident on a mirror section 9a of a biaxial MEMS scanner 9 (refer to FIG. 1B).

Biaxial MEMS Scanner 9

The biaxial MEMS scanner 9 is a fine electronic mirror forming a micro-component which is fused by a machine component and an electronic circuit. Here, the biaxial MEMS scanner 9 is described with reference to FIG. 1B. FIG. 1B is a view illustrating an outline configuration of the biaxial MEMS scanner 9.

The biaxial MEMS scanner 9 includes the mirror section 9a and a mirror driving section 9b. The mirror section 9a is formed in the mirror driving section 9b, and for example, is a biaxial mirror, that is circular and has a diameter of 1 mmφ; however, it is not limited thereto. In addition, a surface of the mirror may be subjected to being coated, such as with aluminum coating.

The mirror driving section 9b is not limited thereto; however, for example, the mirror driving section 9b is an approximately square shape having an angle of 5 mm, and includes the mirror section 9a which is formed inside thereof. The mirror driving section 9b changes the angle in a D1 direction (X axis direction perpendicular to gravity direction) and/or in a D2 direction (Y axis direction set as gravity direction) via a voltage change, and the mirror section 9a formed in the mirror driving section 9b is operated by the angle being changed. Then, by operating the mirror section 9a, the irradiation position of the green laser light which is reflected on the mirror section 9a and then radiated to the light emitting section 1 can be changed (the surface of light emitting section 1 can be two-dimensionally scanned with the green laser light). Accordingly, it is possible that the figure (for example, arrow) can be drawn on the light emitting section 1 (a part of light emitting section 1) with the green laser light (visible light of single color). Accordingly, the light emitting pattern can be generated in which a letter or the figure due to the green visible light overlaps a part of the white light. In addition, as the light emitting pattern, there is a pattern of a light emitting intensity distribution of the light emitting section 1.

The biaxial MEMS scanner 9 of the embodiment guides the green laser light so as to apply the green laser light to the surface of a side where the white light in the light emitting section 1 is mainly taken out. In more detail, the biaxial MEMS scanner 9 guides the green laser light received from the second light source 7 so that the green laser light is obliquely incident on the surface of the light emitting section 1. Accordingly, the light emitting pattern can be generated in which the figure or the like due to the green visible light overlaps a part of the white light. For this reason, the projection pattern in which the figure or the like due to the green visible light overlaps a part of the white light can be projected to the outside. In addition, instead of the biaxial MEMS scanner 9, an optical element having a function as a galvanometer mirror, a polygon mirror, or the like can be used. In addition, the projection pattern is a pattern of an intensity distribution of the light projected to the outside.

Convex Lens 10

The convex lens 10 (projection system) is a lens made of glass or resin that makes the light emitting pattern (light emitting shape) of the light emitting section 1 be imaged as the projection pattern on the outside in a distant place. Accordingly, a pattern (projection pattern) in which the figure, or the like due to the green visible light overlaps a part of the white light is capable of being imaged on the outside.

Figure 2A:
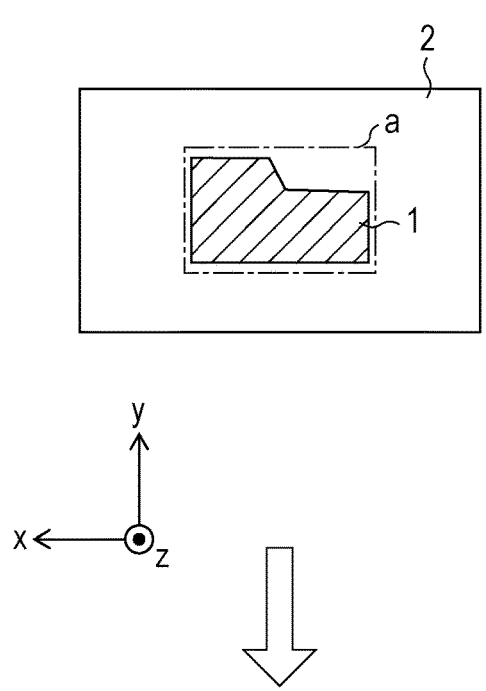
FIGS. 2A to 2D are views illustrating an irradiation position of laser light in the light emitting section and a specific example of a projection pattern of the illuminating apparatus.

Next, FIGS. 2A to 2D are views illustrating a specific example of the irradiation position of the laser light in the light emitting section 1 and the projection pattern of the illuminating apparatus 100. FIG. 2A is a view illustrating the irradiation position of the laser light in the light emitting section 1 when not drawing with the green laser light. In the same drawing, a state of the light emitting section 1 is illustrated when viewed from +z direction to −z direction. As illustrated in the drawing, the shape of the light emitting section 1 can be a right-left asymmetrical shape including a notch with respect to a light distribution pattern of a low beam. In addition, in the drawing, the shape is illustrated as a simple rectangle including a notch having six edges for simplifying the drawing. A main surface (side surface having the largest area) of the light emitting section 1, as described above, may be a right-left asymmetrical shape along a horizontal direction (x axis direction). Accordingly, the projection pattern of color-mixed light of a right-left asymmetrical shape along a horizontal direction according to the shape of the main surface of the light emitting section 1 can be projected.

A region an illustrated in the drawing indicates an irradiation range of the blue laser light by the first light source 4 for exciting the phosphor to the light emitting section 1. The blue laser light is radiated on the light emitting section 1 with a uniform distribution shape of a rectangle by imaging the near field pattern of the emitting end surface of the light guide member 5 including the rectangular light guide region. The blue laser light is radiated in a range wider than the light emitting section 1 (or a portion containing phosphor and emitting light) of which the shape is defined. The light emitting section 1 containing the YAG phosphor is excited by the blue laser light, and then emits light. The blue laser light radiated to the light absorbing material 2 which does not contain the phosphor is absorbed and does not contribute to an emission of the light emitting section 1. Accordingly, the light emitting section 1 can be obtained in a desired shape.

Figure 2C:
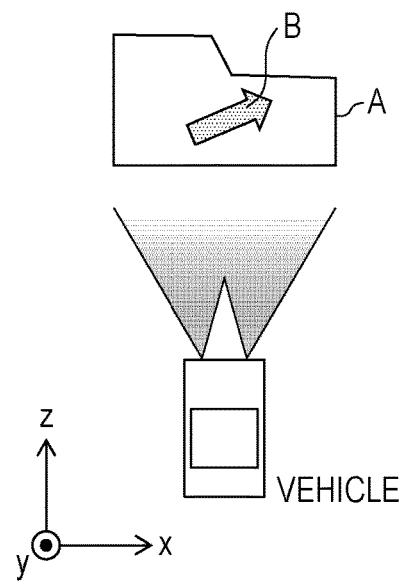
Figure 2B:
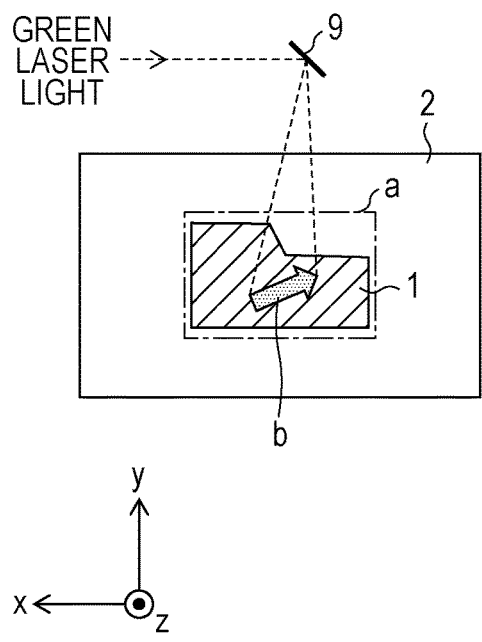

Next, FIG. 2B is a view illustrating the irradiation position of the laser light in the light emitting section 1 when drawing with the green laser light. The figure (for example, arrow) can be drawn on the light emitting section 1 with the green laser light by the above described biaxial MEMS scanner 9. In the drawing, on the light emitting section 1 in a shape corresponding to the low beam pattern, a green arrow b (illustrated as a dotted arrow in the drawing) is drawn in a direction where a notch part exists. In addition, in the drawing, a drawing of biaxial MEMS scanner 9 is a simple illustration schematically illustrating an image of an arrangement and an operation for simplifying the drawing.

Next, FIG. 2C is a view illustrating an example of the projection pattern in the illuminating apparatus 100 and also illustrating that a green arrow B (illustrated as a dotted arrow in the drawing) overlaps the projection pattern A of the low beam.

Figure 2D:
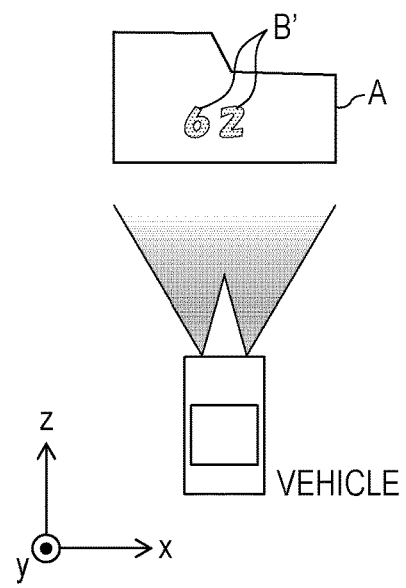

Meanwhile, FIG. 2D is a view illustrating another example of the projection pattern in the illuminating apparatus 100 and also illustrating that green letters (numbers) B' (illustrated as dotted letters (numbers) in the drawing) overlap the projection pattern of the low beam.

As a lens for projecting, the convex lens 10 is used that makes the light emitting pattern (shape and luminance distribution) of the light emitting section 1 in the projection pattern be imaged in a distant place, as illustrated in FIG. 2C, thereby a pattern in which the green arrow figure overlaps can be projected while projecting a pattern by the white light including the notch set as the low beam in a distant place.

The drawing is schematically illustrated, therefore, a beam pattern of an actual vehicle may not be projected with the white light as a pattern in which an angle protrudes to an end portion, or the light intensity distribution may not be uniform. The pattern is preferably a pattern according to a regulation related to the low beam.

The figure drawn in green on the light emitting section 1 is an arrow illustrating a direction including the notch of the pattern of the low beam; however, any figure can be used.

The illuminating apparatus 100 communicates with a car navigation system, and may illustrate a direction in which the vehicle is moved forward onto a road as an arrow based on a detected result of a state of the outside of the vehicle by the system, as illustrated in FIG. 2C, and may notify a driver and a pedestrian near the driver of the resultant (refer to a seventh embodiment as described later).

In addition, the illuminating apparatus 100 communicates through operation of a handle, and may illustrate a direction where the vehicle is moved forward onto a road as an arrow based on a detected result of a state of the vehicle (operation state of handling), as illustrated in FIG. 2D, it may be possible to display information such as notifying the driver that there is a pedestrian nearby (refer to a seventh embodiment).

In addition, the illuminating apparatus 100 communicates with a speedometer, based on a detected result of a state of the vehicle (driving speed of vehicle), as illustrated in FIG. 2D, the driver may be notified of the driving speed of vehicle by illustrating the driving speed of vehicle (for example, 62 Km/h) on the road (refer to a seventh embodiment).

Outline and Operation Effect of the Illuminating Apparatus 100

In the illuminating apparatus 100, information is drawn on (a part of) the light emitting section 1 which emits white light as a color having high visibility (for example, green) so that the drawn information is imaged on the outside.

Specifically, the biaxial MEMS scanner 9 radiates the green laser light with respect to a part of the light emitting section 1. For this reason, since the laser light is scattered on the light emitting section 1 first and spatial coherency deteriorates, and a peculiar condensing performance of the laser light (illumination light) disappears, it can be considered as safety light which is the same as natural light. In addition, in the illuminating apparatus 100, information is loaded in the white light through the green visible light, and visibility of the information loaded in the illumination light improves. According to the above, the safety of the illumination light and the visibility of the information loaded in the illumination light can improve.

In addition, the illuminating apparatus 100 has specific effects described below.

(1) For a person in the vehicle and a person outside of the vehicle, any information relating to a state of the vehicle can be clearly displayed on the road in a color having high visibility, thereby safe driving is possible for the vehicle and for the area around the vehicle. Particularly, it is important in the present application that laser is used as the second light source. Since the laser light is light having good visibility with a particularly remarkable high contrast because a spectrum line width thereof is narrow, it is most preferable in terms of improving the visibility of the information.

(2) Particularly, in the embodiment, since the projection system of the headlamp as the white illumination is used as a base, a new projection system for projecting information of a vehicle is not used, therefore, it is realized in a simple form and at a relatively low cost and saves space.

(3) In the display of information, visible laser light (green laser light) is used to draw on the light emitting section 1. The visible laser light projects an image scattered on the surface of the light emitting section 1 by the lens, and thus the laser light collimated with high luminance is not radiated. Therefore, it is treated as safe light which is the same as typical light.

(4) The visible laser light radiated to the light emitting section 1 is preferably of a wavelength which is not absorbed by the phosphor constituting the light emitting section 1. By such a configuration, the visible laser light is only scattered. Accordingly, the luminance distribution, or the like of the white light which is used as a base is not affected.

(5) The information being displayed can be any figure or a number based on various pieces of information, such as those obtained from the vehicle, using the car navigation system, a speedometer, or a brake operation (refer to seventh embodiment). In addition, by blinking the displayed information, an effect of attracting attention can be obtained. Specifically, a laser light radiation device including the second light source 7, the lens 8, and the biaxial MEMS scanner 9 may intermittently radiate the green laser light to the light emitting section 1. Accordingly, the figure of the green visible light overlapping a part of the white light, or the like can be blinked. Particularly, it is important in the present application that laser is used as the second light source. As the second light source, the laser is most preferable in that an irradiation pattern of the laser light can be controlled efficiently and desirably through various optical systems (MEMS, light guide member, lens, mirror, or the like), and can radiate a fine figure by drawing with the parallel light.

Second Embodiment

FIG. 3 is a view illustrating an outline configuration of the illuminating apparatus 200 according to the second embodiment of the disclosure. The illuminating apparatus 200 has a configuration in which a surface to which the excitation light is radiated with respect to the light emitting section and a surface from which the illumination light is mainly taken out face each other, and hereinafter, it is referred to as a transmission type illuminating apparatus. A beam spot of the red laser light on the surface of the light emitting section 1 is enlarged and projected (communicated with a vehicle camera, or the like; refer to the eighth embodiment). As illustrated in the drawing, the illuminating apparatus 200 includes the light emitting section 1, the light absorbing material 2, a support base 3a, the first light source 4, the second light source 7, the lens 8, a transparent member 11, an optical fiber 12, and a reflecting mirror (light radiating section) 13.

Light Emitting Section 1

The light emitting section 1 contains phosphors respectively emitting red, blue, and green light so as to be excited by blue-violet laser and to emit white light. The light emitting section 1 of the embodiment is attached to the transparent member 11 by scattering the phosphor powder in the glass. The light emitting section 1 is disposed in a position where a penetration hole O of the support base 3a to be described later is blocked.

Support Base 3a

The support base 3a is different from the above described the support base 3 in that the penetration hole O is installed in the center thereof and an emitting end portion of the optical fiber 12 is inserted into the penetration hole O; however, the others are the same as the support base 3, therefore, a description thereof will be omitted here.

First Light Source 4

The first light source 4 of the embodiment is a blue-violet semiconductor laser element, and outputs blue-violet laser light (first light) with 405 nm wavelength and 10 W of output. The first light source 4 is mounted in the heat sink for radiating heat (not illustrated) and is coupled to the power source circuit for driving (not illustrated). In addition, as the first light source 4 of the embodiment, the semiconductor laser element is used; however, it is not limited thereto, and the semiconductor light emitting element such as the LED may be used.

Second Light Source 7

The second light source 7 of the embodiment is a red semiconductor laser element, and outputs the red laser light (second light) which does not contribute to the excitation of the phosphor with 638 nm wavelength and 0.5 W of output contained in the light emitting section 1. The second light source 7 is mounted in the heat sink for radiating heat (not illustrated) and is coupled to the power source circuit for driving (not illustrated). In addition, as the second light source 7 of the embodiment, the semiconductor laser element is used; however, it is not limited thereto, and the semiconductor light emitting element such as the LED may be used.

Lens 8

The lens 8 of the embodiment is a convex lens made of a resin or glass and has a function of enlarging a light spot of the incident red laser light.

Transparent Member 11

The transparent member 11 is installed between the light emitting section 1 (and light absorbing material 2) and the support base 3a so as to block the support base 3a. The transparent member 11 is a plate shaped member made of the resin or the glass which has transparency. The transparent member 11 may be formed of a material through which most of the blue-violet laser light emitted from the emitting end portion of the optical fiber 12 passes.

Optical Fiber 12

The optical fiber 12 is a multimode optical fiber in which a cross section thereof has a rectangular core. In addition, in the embodiment, the emitting end portion of the optical fiber 12 is disposed at a position slightly deviated from the transparent member 11; however, the emitting end portion of the optical fiber 12 may be disposed to come into contact with the transparent member 11. In addition, a separate optical member such as a lens may be disposed between the emitting end portion of the optical fiber 12 and the transparent member 11.

Reflecting Mirror 13

The reflecting mirror 13 reflects the red laser light enlarged by the lens 8, and further enlarges the light spot of the red laser light to radiate the light emitting section 1. According to the above configuration, the light emitting pattern occurs in which the light spot overlaps a part of the white light due to the red visible light.

Next, FIGS. 4A to 4B are views illustrating the irradiation position of the laser light in the light emitting section 1 and a specific example of the projection pattern of the illuminating apparatus 200. FIG. 4A is a view of the irradiation position of the laser light in the light emitting section 1 when being irradiated without the red laser light. The drawing illustrates a state of the light emitting section 1 when viewed from +z direction to −z direction. As illustrated in the drawing, the shape of the light emitting section 1 can be a shape corresponding to a light distribution pattern of the low beam. In addition, in the drawing, the shape is illustrated as a simple rectangle including a notch having six edges for simplifying the drawing.

The region an illustrated in the drawing illustrates an radiation range of the blue-violet laser light by the first light source 4 for exciting the phosphor. The blue-violet laser light is radiated to a paper surface from a rear side (radiated from the −z direction toward +z direction).

The blue-violet laser light from the emitting end portion of the optical fiber 12 having rectangular core is widened and is radiated to a range of dotted line. That is, the blue-violet laser light is radiated to a range which is widened slightly more than the light emitting section 1. The blue-violet laser light is radiated to the range which is widened more than the light emitting section 1 of which shape is defined (portion containing phosphor and emitting light). The light emitting section 1 is excited by the blue-violet laser light and emits light. The blue-violet laser light radiated to the light absorbing material 2 which does not contain the phosphor is absorbed so as not to contribute to emission by the light emitting section 1. Accordingly, the light emitting section 1 can be obtained in a desired shape. The light emitting section 1 emits white light by mixing red light, blue light, and green light which are emitted from the phosphor contained therein.

Next, FIG. 4B is a view illustrating the irradiation position of the laser light in the light emitting section 1 when being irradiated with the red laser light. The red laser light enlarged by the lens 8 is radiated onto the light emitting section 1 through the reflecting mirror 13. In the drawing, there is an example in which the red laser is radiated in the shape of an ellipse c near the notch portion on the light emitting section 1 in a shape corresponding to the low beam pattern. In addition, in the drawing, the second light source 7 and the reflecting mirror 13 are a simple illustration schematically illustrating an image of an arrangement and an operation for simplifying the drawing.

Next, FIG. 4C is a view illustrating an example of the projection pattern in the illuminating apparatus 200, and illustrating overlapping the projection pattern of the low beam and a pattern of the red spot shape C (illustrated as the dotted spot shape in the drawing).

As a lens for projection, the convex lens 10 is used that makes the light emitting pattern (shape and luminance distribution) of the light emitting section 1 be imaged in a distant place, thereby a pattern of the red spot shape in which a part thereof (for example, near notch portion) is overlapped can be projected while projecting a pattern by the white light including the notch set as the low beam in a distant place.

The drawing is schematically illustrated, therefore, a low beam pattern of an actual vehicle may not be projected with the white light as a pattern in which an angle protrudes to an end portion, or the light intensity distribution may not be uniform. It is preferably a pattern according to a regulation related to the low beam.

An overlapped red spot in the light emitting section 1 can be used as a signal which notifies the inside of the car (driver and passenger) or the outside of the car (pedestrian and other drivers) of a state of the car or a driver. In addition, the red light spot can be lightened or blinked as desired. The laser light radiation device including the second light source 7, the lens 8, and the reflecting mirror 13 may intermittently radiate the red laser light to the light emitting section 1. Accordingly, the light spot which overlaps a part of the light which is color-mixed can be blinked using the red visible light.

In addition, the illuminating apparatus 200 can be used as described below. (1) The illuminating apparatus 200 may blink red when detecting biological information which communicates as information indicating the driver is asleep, and is used in determining that the driver feels sleepy. (2) The illuminating apparatus 200 may blink red when communicating with the on-vehicle camera, determining the speed of the vehicle, the speed of another vehicle in front of the vehicle, and a distance between the vehicles, and determining that a collision with vehicles is predicted (refer to the eighth embodiment to be described later). (3) The illuminating apparatus 200 periodically lightens or blinks when driving during heavy fog or rain so as to be capable of displaying information such as notifying the (be lightened by the driver intentionally) the peripheral area of the existence of the vehicle itself. (4) In the embodiment, as the information loaded in the white light, the red light spot is exemplified; however, a shape may not be light spot. The information loaded in the white light may be a figure, a letter, or a symbol indicating a warning.

Third Embodiment

Figure 5:
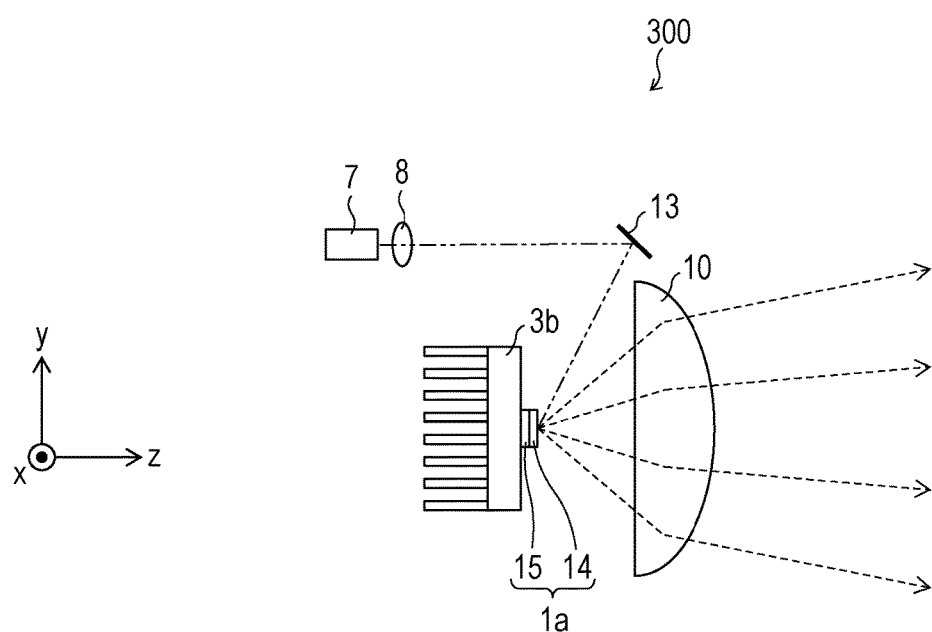
FIG. 5 is a view illustrating an outline configuration of an illuminating apparatus according to a third embodiment of the disclosure.

FIG. 5 is a view illustrating an outline configuration of an illuminating apparatus 300 according to the third embodiment of the disclosure. The illuminating apparatus 300 beam-enlarges a line on a surface of the phosphor part 14 of a white LED with the green laser light and projects the resultant (frequently, attracting attention to the pedestrian). As illustrated in the drawing, the illuminating apparatus 300 includes a light emitting section 1*a*, the support base 3*b*, the second light source 7, the lens 8, the convex lens (light projection section) 10, and the reflecting mirror (the light radiating section) 13.

Light Emitting Section 1*a*

The light emitting section 1*a* is the white LED (Light Emitting Device) in which the yellow phosphor (YAG phosphor) is formed on a blue light emitting LED, and is configured to have a phosphor part (light emitting section) 14 and an LED chip (first light source) 15. The LED chip 15 outputs blue light that excites a phosphor contained in the phosphor part 14. The LED chip 15 includes a power supply electrode (not illustrated), and the electrode is coupled to an electronic circuit (not illustrated). According to the above configuration, the light emitting pattern can be generated in which a line or the like by the green visible light overlaps a part of a surface of a light source of the white light obtained by color-mixing fluorescence of the phosphor excited by the LED chip 15 as an excitation light source and the blue light from the LED.

Support Base 3*b*

The support base 3*b* includes a heat radiating pin formed in a configuration in which protrusions are formed, therefore, a heat radiating effect is improved more than in the above described support base 3. In addition, the other parts of the support base 3*b* are the same as those of the support base 3, and a description thereof will be omitted here.

Second Light Source 7

The second light source 7 is a green semiconductor laser element, and outputs the green laser light with 530 nm wavelength and 0.2 W of output. The second light source 7 is mounted in the heat sink for radiating heat (not illustrated) and is coupled to the power source circuit for driving (not illustrated). In addition, as the second light source 7 of the embodiment, the semiconductor laser element is used; however, it is not limited thereto, and the semiconductor light emitting element such as the LED may be used.

Lens 8

The lens 8 of the embodiment is a convex lens made of a resin or a glass, and has a function of enlarging and projecting the near field pattern in a linear shape of the incident green laser light.

Reflecting Mirror 13

The reflecting mirror 13 reflects the green laser light enlarged by the lens 8 and irradiates the light emitting section 1 with a pattern in the linear shape of the green laser light.

Figure 6A:
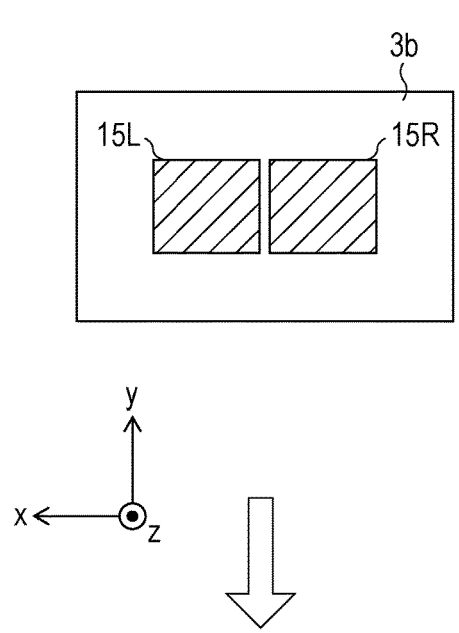
FIGS. 6A to 6D are views illustrating an irradiation position of laser light in the light emitting section and a specific example of a projection pattern of the illuminating apparatus.
Figure 6C:
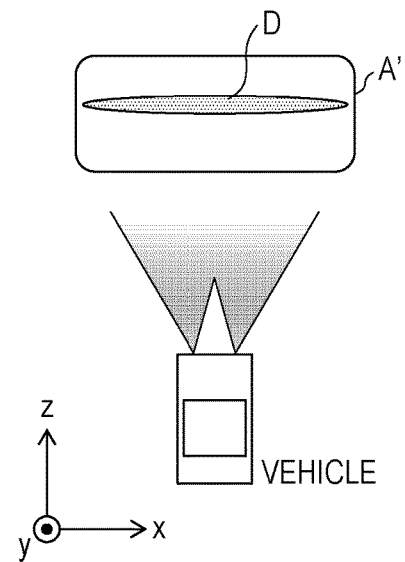
Figure 6B:
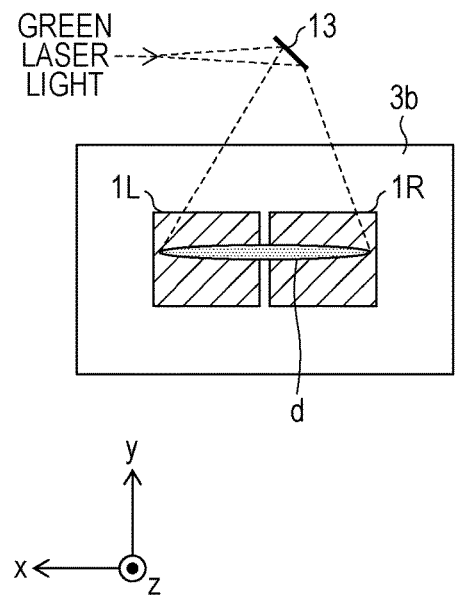

Further, FIGS. 6A to 6B are views illustrating the irradiation position of the laser light in the light emitting section 1 and a specific example of the projection pattern of the illuminating apparatus 300. FIG. 6A is s a view illustrating the irradiation position of the laser light in the light emitting section 1 when being irradiated without the green laser light. The drawing illustrates a state of the light emitting section 1 when viewed from the +z direction to the z direction. The LED chips 15L and 15R are formed in a configuration in which the two LED chips including the phosphor in a substantial square surface shape thereon are parallel within two plane surfaces.

Next, FIG. 6B is a view illustrating the irradiation position of the laser light in the light emitting section 1 when being irradiated with the green laser light. The green laser light enlarged as the linear shape by the lens 8 is radiated onto the light emitting section 1L and 1R through the reflecting mirror 13.

In the drawing, there is an example in which a pattern in a green linear shape d (illustrated as a dotted linear shape in the drawing) is projected in the horizontal direction of the light emitting section 1 so that the green line extended in a horizontal direction is projected onto the road when being projected on the road. In addition, in the drawing, each drawing of the second light source 7 and the reflecting mirror 13 is a simple illustration schematically illustrating an image of an arrangement and an operation for simplifying the drawing.

Figure 6D:
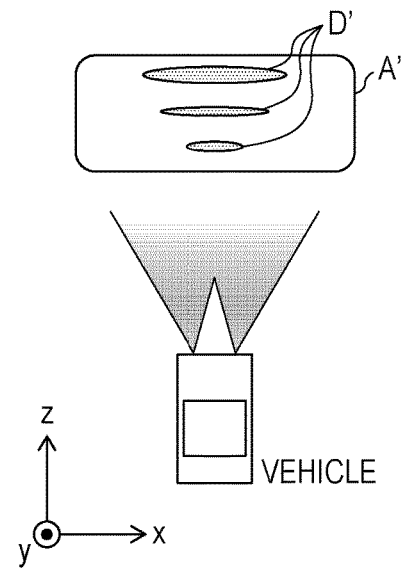

Next, FIG. 6C illustrates that a projection pattern A' in a substantially rectangular shape overlaps a pattern D in the green linear shape (illustrated as a dotted linear shape in the drawing). Meanwhile, FIG. 6D illustrates a state in which patterns D' in a plurality of green linear shapes having different lengths are projected on the road every 5 m.

As described above, accordingly the illuminating apparatus 300 can project the white light in a distant place and perform a projection in which the pattern in the green linear shape overlaps an area where the white light is projected.

The drawing is schematically illustrated, and a projection pattern of a headlamp of an actual vehicle may be a pattern according to a regulation. The illuminating apparatus 300 can be a low beam, a high beam, or a variable light distribution headlamp.

The projection of the green linear shape overlapping the white light projection from the light emitting section 1a can be used as a signal that notifies the inside or the outside (pedestrian and other drivers) of the car of an approaching car, or the like. In addition, the green line can be lightened or blinked as desired. Specifically, the laser light radiation device including the second light source 7, the lens 8, and the reflecting mirror 13 may intermittently radiate the green laser light to the light emitting section 1. Accordingly, the line of green visible light which overlaps a part of the white light can be blinked.

According to the illuminating apparatus 300, the green line is projected at a position far away from a specific distance (for example, 10 m) from the car, making it possible to notify the pedestrian of an approaching car. In addition, according to the illuminating apparatus 300, it is possible to display information such as information that the driver of the car can use a position of the green line on the road including a distance between the front car and the car, as a reference.

In the example as illustrated in FIG. 6C, one green line (illustrated as a dotted linear shape in the drawing) is illustrated; but it is not limited thereto. As illustrated in FIG. 6D, a plurality of lines may be projected at a predetermined interval, and a light spot, or a figure, a letter, a signal, or the like may be projected at a predetermined position.

For example, as illustrated in FIG. 6D, the lines having different lengths are projected on a plurality of the roads at a specific distance (for example, for every 5 m), and thereby a distance between the car and the front car can be known.

Fourth Embodiment

FIG. 7 is a view illustrating an outline configuration of an illuminating apparatus 400 according to a fourth embodiment. The illuminating apparatus 400 diffuses each laser light of R (Red), G (Green), and B (Blue), scans a surface of the diffusion plate 16 which emits white light with red laser light, and draws a figure such as an arrow thereon (communicates with a car navigation, or the like; refer to a seventh embodiment). As illustrated in the drawing, the illuminating apparatus 400 includes the support base 3, the second light source 7, the lens 8, the biaxial MEMS scanner (the light radiating section) 9, the convex lens (light projection section) 10, a reflecting mirror 13', semiconductor laser beams (first light source) 17a to 17c, an optical fiber 18, an optical fiber coupler 19, an optical fiber 20, and an imaging lens 21.

Second Light Source 7

The second light source 7 of the embodiment is a red semiconductor laser element and outputs the red laser light (second light) with 650 nm wavelength and 0.3 W of output. The second light source 7 is mounted in the heat sink for radiating heat (not illustrated) and is coupled to the power source circuit for driving (not illustrated). In addition, as the second light source 7 of the embodiment, the semiconductor laser element is used; however, it is not limited thereto, and the semiconductor light emitting element such as the LED may be used.

Lens 8

The lens 8 of the embodiment is a collimate lens, and is an optical member for making the red laser light emitted from the second light source 7 be parallel light incident to the mirror section 9a of the biaxial MEMS scanner 9 (refer to FIG. 1B).

Diffusion Plate 16

The diffusion plate 16 is a member made of metal in a plate shape in which a surface thereof is formed in a fine concave-convex shape, and functions as the light emitting section (phosphor is not contained) that emits white light by diffusing each radiated laser light of R, G, and B. Accordingly, a figure, or the like due to the red visible light can overlap the white light generated by diffusing laser light of three kinds of R, G, and B which are visible light. The diffusion plate 16 is preferably a diffusion plate made of metal for obtaining heat radiation; however it is preferably a diffusion plate made of other materials such as glass or ceramics.

Semiconductor Laser Beams 17a to 17c

The semiconductor laser beams (first light source) 17a to 17c are respectively a semiconductor laser emitted in various colors, for example, blue (450 nm, 2 W; first light), green (530 nm, 1 W; first light), and red (640 nm, 1.5 W; first light). The semiconductor laser beams 17a to 17c are respectively mounted in the heat sink for radiating heat (not illustrated) and are coupled to the power source circuit for driving (not illustrated). The semiconductor laser beams 17a to 17c are respectively and optically coupled to three optical fibers 18 through the convex lens (not illustrated). In addition, instead of the above described semiconductor laser beams 17a to 17c, the semiconductor light emitting element such as the LED may be used.

Optical Fiber 18, Optical Fiber Coupler 19, Optical Fiber 20

The three optical fibers 18 are respectively coupled to the optical fiber 20 through the optical fiber coupler 19. The optical fiber 20 is a multimode optical fiber having a circular shape core, and light from a plurality of the laser beams of R, G, and B is mixed in the optical fiber to emit uniform white light.

Imaging Lens 21

The imaging lens 21 is a convex lens disposed between the emitting end portion of the optical fiber 18 and the reflecting mirror 13'. The imaging lens 21 sets an image forming surface of a near field pattern of the white light which is generated on the emitting end surface of the optical fiber 18. The imaging lens 21 is, for example, formed of glass. The white light passes through the imaging lens 21 and is incident to a surface of the light emitting section 1 through the reflecting mirror 13'. Accordingly, the white light can be radiated onto the light emitting section 1 in a shape of the emitting end surface of the optical fiber 18 with a uniform distribution.

Figure 8A:
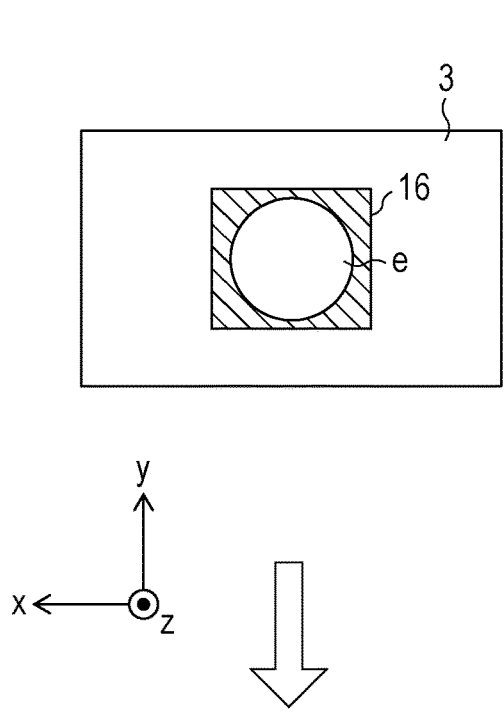
FIGS. 8A to 8D are views illustrating an irradiation position of laser light in the light emitting section and a specific example of a projection pattern of the illuminating apparatus.

Next, FIG. 8A to 8D are views illustrating the irradiation position of the laser light in the light emitting section 1 and a specific example of the projection pattern of the illuminating apparatus 400. FIG. 8A is a view illustrating the irradiation position of the laser light in the light emitting section 1 when not drawing with the red laser light. The drawing illustrates a state of the light emitting section 1 when viewed from +z direction to −z direction. The diffusion plate 16 is a plate shaped member made of metal (surface of aluminum coated with silver). Since a surface thereof has a fine concave-convex shape, it makes the radiated light of R, G, and B be scattered at random.

In relation to a region e as illustrated in the drawing, the white light mixed including blue laser, green laser, and red laser can be radiated in circular shape on a part or the entirety of the diffusion plate 16. The radiated white light is scattered on a surface of the diffusion plate 16, and a part irradiated with the white light functions as a new white light source.

Figure 8C:
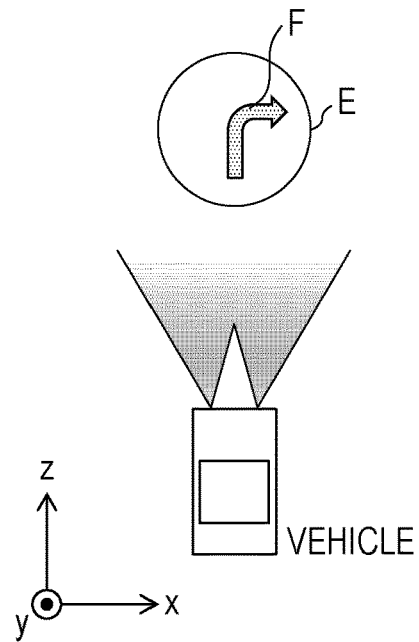
Figure 8B:
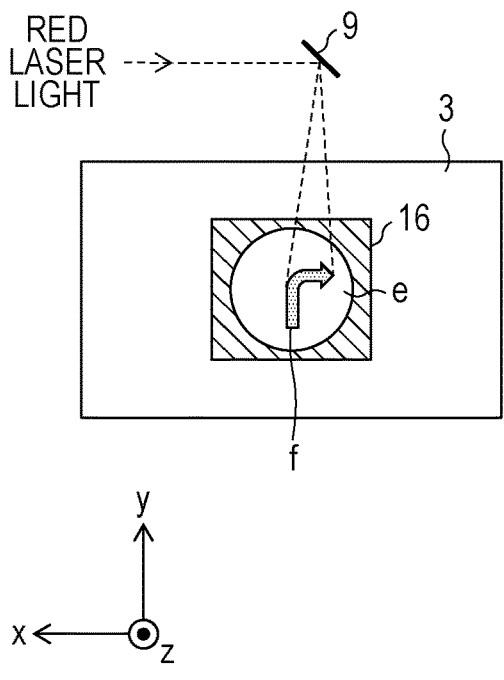

Next, FIG. 8B is a view illustrating an irradiation position of the laser light in the light emitting section 1, when drawing with the red laser light.

As illustrated in the drawing, a figure (for example, arrow) can be drawn on the light emitting section 1 by the biaxial MEMS scanner 9 including the red laser light. In addition, instead of the biaxial MEMS scanner 9, an optical element having the same function as a galvano mirror, a polygon mirror, or the like can be used.

In the drawing, an arrow f is drawn in red (illustrated as a dotted arrow in the drawing) on the light emitting section 1 in a shape corresponding to the white projection pattern in a circle. In addition, in the drawing, a drawing of the biaxial MEMS scanner 9 is a simple illustration schematically illustrating an image of an arrangement and an operation for simplifying the drawing.

Next, the FIG. 8C illustrates that a projection pattern E in a white circular shape is overlapped with a pattern F in a red arrow shape (illustrated as a dotted arrow in the drawing). In the pattern F' of a human hand illustrated in FIG. 8D, it is possible to make a pattern such as any figure or a symbol overlap the white projection pattern E.

Figure 8D:
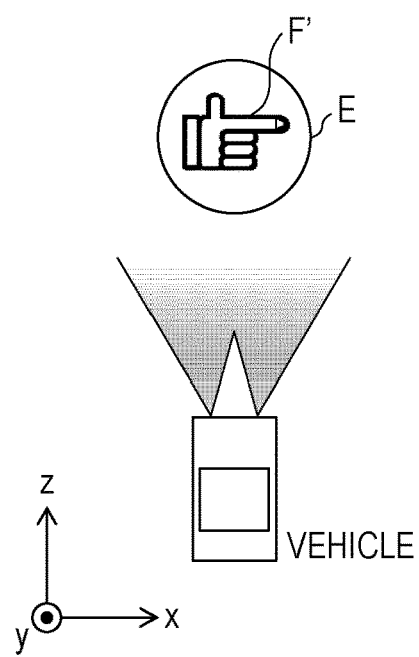

FIGS. 8C and 8D are schematically illustrated, and a projection pattern of a headlamp of an actual vehicle may be a pattern according to a regulation. The white projection in a circular shape can be used as high beam. In addition, a cut-off line is made by shading a headlamp to be a low beam, or a variable light distribution headlamp.

A projection in a red arrow shape overlapping a white light projection can be used as a signal that notifies the inside or the outside (pedestrian and other drivers) in the car of an approaching car, or the like. In addition, the red arrow can be lightened or blinked as desired. Specifically, the second light source 7 radiates the red laser light as desired, and may intermittently radiate the red laser light.

The red arrow may be any figure or a symbol which indicates a direction. More specifically, (1) The illuminating apparatus communicates with a car navigation system, and may illustrate a direction in which the vehicle is moved forward onto a road as an arrow (based on a detected result of a state of the outside of the vehicle by the system), and may notify the driver and the pedestrian near the driver of the resultant (refer to a seventh embodiment as described later). (2) The illuminating apparatus communicates with an operation of a handle (based on a detected result of a state of the vehicle), and may illustrate a direction where the vehicle is moved forward onto a road as an arrow, it may be possible to display information for example notifying a pedestrian near the driver of the information (refer to the seventh embodiment). (3) The illuminating apparatus communicates with a speedometer (based on a detected result of a state of the vehicle), and it is possible to display the speed of the car to the driver by illustrating a driving speed of the car on the road (refer to the seventh embodiment).

Fifth Embodiment

Figure 9:
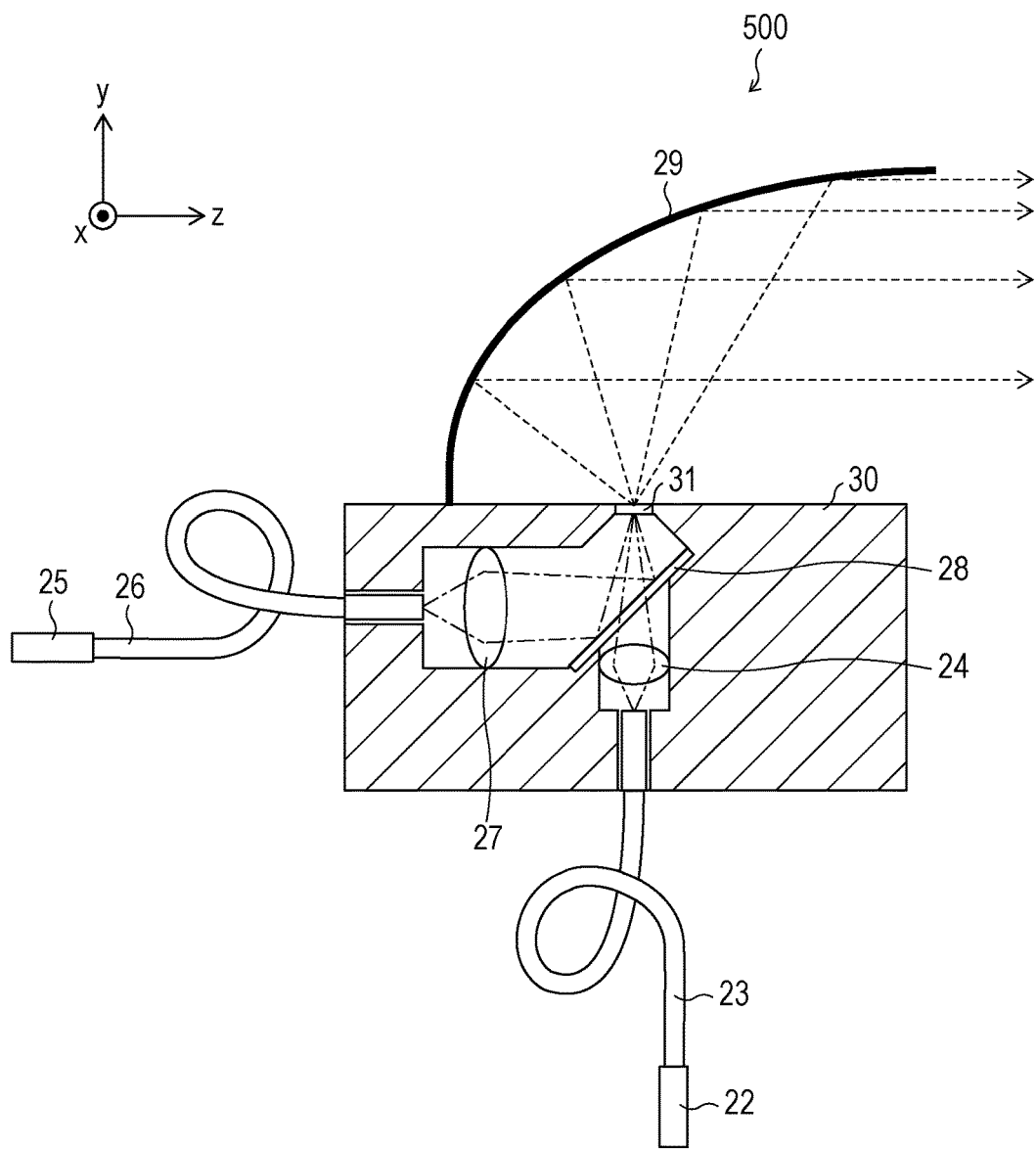
FIG. 9 is a view illustrating an outline configuration of an illuminating apparatus according to a fifth embodiment of the disclosure.

FIG. 9 illustrates an outline configuration of an illuminating apparatus 500 of the fifth embodiment. The illuminating apparatus 500 is a transmission type illuminating apparatus, and projects the red light spot to a rear surface of the light emitting section 31 with the red laser light so that a color temperature of the white light can be desirably changed. As illustrated in the drawing, the illuminating apparatus 500 includes a second light source 22, a light guide member 23, a condenser lens 24, a first light source 25, a light guide member 26, the condenser lens 27, a dichroic mirror (the light radiating section) 28, a case body 30, and a light emitting section 31.

Second Light Source 22

The second light source 22 is a red semiconductor laser element, and emits the red laser light (second light) with 650 nm wavelength and 0.3 W of output. The second light source 22 is mounted in the heat sink for radiating heat (not illustrated) and is coupled to the power source circuit for driving (not illustrated). In addition, as the second light source 22 of the embodiment, the semiconductor laser element is used; however, it is not limited thereto, and the semiconductor light emitting element such as the LED may be used.

Light Guide Member 23

The light guide member 23 is a light guide member that guides the red laser light input from the second light source 22 to an area near the condenser lens 24. The light guide member 23 is constituted of, for example, the optical fiber.

Condenser Lens 24

The condenser lens 24 makes a light spot of the red laser light radiated (radiated) from the emitting end portion of the light guide member 23 reduce so as to collect at a specific position.

First Light Source 25

The first light source 25 is a blue laser element and outputs the blue laser light (first light) exciting the phosphor contained in the light emitting section 31 with 450 nm wavelength and 5 W of output. The first light source 25 is mounted in the heat sink for radiating heat (not illustrated) and is coupled to the power source circuit for driving (not illustrated). In addition, as the first light source 25 of the embodiment, the semiconductor laser element is used; however, it is not limited thereto, and the semiconductor light emitting element such as the LED may be used.

Light Guide Member 26

The light guide member 26 is a light guide member that guides the blue laser light input from the first light source 25 to an area near the condenser lens 27. The light guide member 26 is made of, for example, the optical fiber.

Condenser lens 27

The condenser lens 27 makes a light spot of the blue laser light emitted from the emitting end portion of the light guide member 26 shrink so as to collect at a specific position.

Dichroic Mirror 28

The dichroic mirror 28 is a dielectric multi-layer coating mirror that reflects the blue laser light incident at 45 degrees and transmits the red laser light incident at 45 degrees.

Parabolic Reflector 29

The parabolic reflector 29 is a reflection mirror that reflects the light emitted from the light emitting section 31 and forms a pencil of rays (illumination light) proceeding into a predetermined solid angle. The parabolic reflector 29 may be, for example, a member made of a resin in which a thin metal film is formed on a surface thereof, or may be a member made of metal.

The parabolic reflector 29 includes, on a reflecting surface thereof, at least a part of a portion curved surface obtained by cutting a curved surface (rotation parabola surface) which is formed by rotating a parabola axis as a symmetry axis of the parabola that is a rotation axis to a plane surface which includes the rotation axis. In addition, in the case of the parabolic reflector 29 when viewed from the front of the illuminating apparatus 500, an opening portion (outlet of illumination light) thereof is a half circle.

Case Body 30 and Light Emitting Section 31

The light emitting section 31 is a cylinder shaped light emitting section containing the above described a YAG phosphor and is excited by the blue laser light so as to emit yellow light. The light emitting section 31 emits white light because the blue laser light and the yellow fluorescence are color-mixed. The light emitting section 31 is a section in which the phosphor powder of a YAG phosphor is scattered in glass, and the side surface is supported by the case body 30. In addition, the light emitting section 31 is disposed at a focus position of the parabolic reflector 29. In the illuminating apparatus 500, the blue laser light and the red laser light are radiated to a surface of a side near the parabolic reflector 29 of the light emitting section 31 and a surface of an opposite side thereto.

Figure 10A:
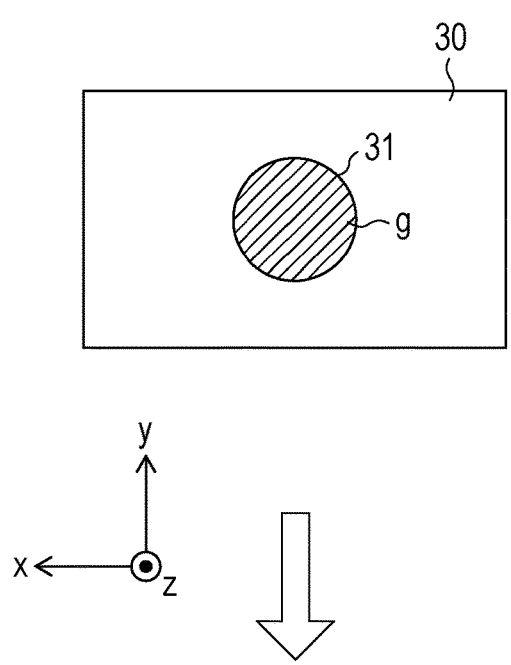
FIGS. 10A to 10C are views illustrating an irradiation position of laser light in the light emitting section and a specific example of a projection pattern of the illuminating apparatus.

Next, FIG. 10 is a view illustrating a specific example of the irradiation position of the laser light in the light emitting section 31 and the projection pattern of the illuminating apparatus 500. FIG. 10A is a view illustrating the irradiation position of the laser light in the light emitting section 31 when being irradiated without the red laser light. The drawing illustrates a state of the light emitting section 1 when viewed from +z direction to −z direction.

The region g illustrated in the drawing illustrates that the blue laser light in a circular shape is radiated to a circular surface of the cylinder shape light emitting section 31. Accordingly, the light emitting section 31 is a white light source that emits light in the light emitting pattern in a circle.

Figure 10C:
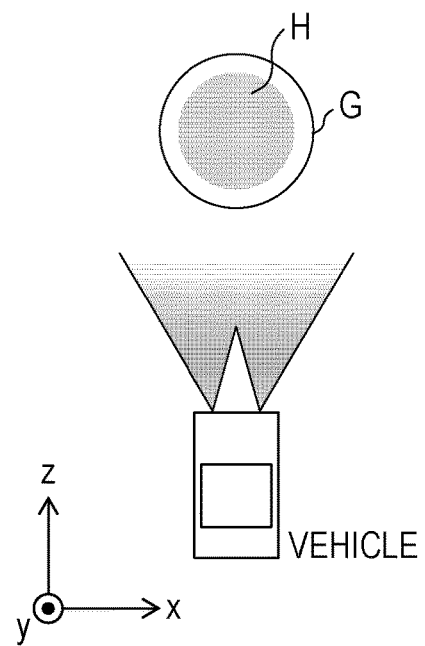
Figure 10B:
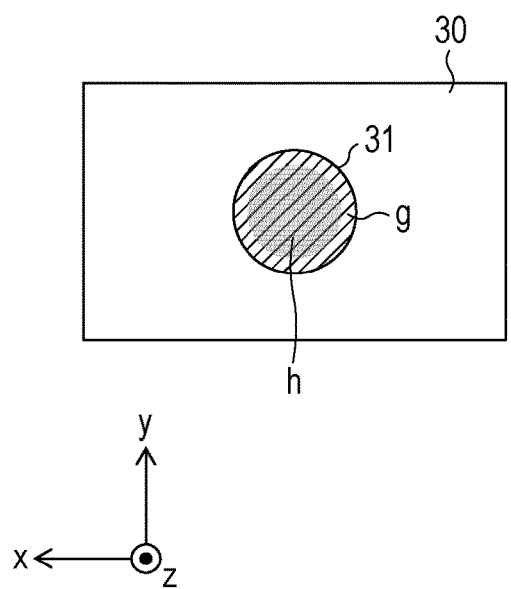

FIG. 10B illustrates the irradiation position of the laser light of the light emitting section 31 when being irradiated with the red laser light.

By irradiating a circular region h near the center of the region g which functions as white light source in a circular shape with the red laser light, the color temperature near the center of the white light source is decreased. For example, due to the red laser light that is radiated to the white light source having a color temperature of 6000K when the red laser light is not radiated, only a part where the red laser light is added reaches a color temperature of 3000K. In addition, the red laser light may be radiated to the entire surface of the light emitting section 31 or may be radiated thereto partially.

Next, FIG. 10C illustrates an example of the projection pattern of the illuminating apparatus 500. As shown in the drawing, according to the illuminating apparatus 500, the white light is projected in a distant place, and a white light pattern H having low color temperature only in the center of a projection pattern G in a circular shape can be projected. Lowering the color temperature of the center of the projection pattern G is not only performed in the center of a projection pattern G, but it also can be performed in a part or the entirety of a range of the white light projection of the projection pattern G.

FIG. 10C is schematically illustrated, and a projection pattern of a headlamp of an actual vehicle may have a pattern according to a regulation. The white projection in a circular shape can be used as a high beam. In addition, a cut-off line is made by shading so as to be a low beam, or a variable light distribution headlamp.

Decreasing the color temperature of a part or the entirety of the light by applying the red laser light may be performed in an automatic manner or a manual manner as desired. In addition, the red laser light may be blinked.

The illuminating apparatus 500 achieves a specific effect hereinbelow.

Since the color temperature of a part or the entirety of the light is decreased by applying the red laser light to the white light, additional functions can be obtained as follows: (1) Color temperature of the headlamp can be changed as desired according to the taste of the driver. (2) By decreasing the color temperature during smog or rain, visibility can be improved.

In addition, by intermittently changing the color temperature multiple times quickly, flashing is performed without reducing the amount the headlamp (as signal displaying existence of car near thereof).

In addition, since a mechanism that moves a position of the lens 24 is installed in the y axis direction of FIG. 9, a size of the spot of the red laser light radiated to the light emitting section can be changed. An actuator can be used to operate the lens in a Y direction. Since the color temperature in the projection pattern is lowered by varying the size of the spot of the red laser light, a projection range can be arbitrarily changed.

In addition, in the case in which the color temperature of the entirety of the projection pattern is changed, a projection system may not be formed in an optical design that images the light emitting pattern of the light emitting section in a distant place. For example, as the embodiment, a configuration in which the light emitting section is installed at a focal position of the parabolic reflector 29 may be adopted. In addition, a curved surface, a multifaceted mirror, or the like made of the deformed parabolic reflector can be used.

Sixth Embodiment

FIG. 11 illustrates an outline configuration of an illuminating apparatus 600 according to the sixth embodiment.

The illuminating apparatus 600 is a reflection type illuminating apparatus, and irradiates a surface of the light emitting section 33 with a spot pattern of infrared laser light and projects the white light overlapping the infrared light (communicated with the on-vehicle camera; refer to the eighth embodiment to be described later). Light overlapping the white light as the embodiment may not be visible light, but the infrared can overlap the white light.

The illuminating apparatus 600 as illustrated in the drawing includes the second light source 7, the lens 8, the biaxial MEMS scanner (the light radiating section) 9, the convex lens (light projection section) 10, the first light source 25, the light guide member 26, the condenser lens 27, the parabolic reflector 29, the support base 32, and the light emitting section 33.

Second Light Source 7

The second light source 7 is an infrared semiconductor laser element, and emits the infrared laser light (second light) with 850 nm wavelength and 0.5 W of output. The second light source 7 is mounted in the heat sink for radiating heat (not illustrated) and is coupled to the power source circuit for driving (not illustrated). In addition, as the second light source 7 of the embodiment, the semiconductor laser element is used; however, it is not limited thereto, and the semiconductor light emitting element such as the LED may be used.

Lens 8

The lens 8 of the embodiment is a so called collimate lens, and is an optical member that makes the infrared laser light emitted from the second light source 7 be parallel light incident on a mirror section 9a of a biaxial MEMS scanner 9 (refer to FIG. 1B). In addition, a function of the biaxial MEMS scanner 9 and the convex lens 10 is the same in as the above description. The description thereof will be omitted here.

First Light Source 25

The first light source 25 of the embodiment is a blue-violet semiconductor laser element, and emits the blue-violet laser light (first light) with 405 nm wavelength and 10 W of output which excites the phosphor contained in the light emitting section 33. The first light source 25 is mounted in the heat sink for radiating heat (not illustrated) and is coupled to the power source circuit for driving (not illustrated). In addition, as the first light source 25 of the embodiment, the semiconductor laser element is used; however, it is not limited thereto, and the semiconductor light emitting element such as the LED may be used.

Light Guide Member 26

The light guide member 26 of the embodiment is a multimode type of the optical fiber having rectangular cross-sectional core.

Condenser Lens 27

The condenser lens 27 is a member that images the light spot of the blue-violet laser light emitted from the emitting end portion of the light guide member 26 at a specific position.

Parabolic Reflector 29

The parabolic reflector 29 is the same as that in the above description; however, in the embodiment, the reflector is different from that in the above description in that a window portion is formed on a part of the reflector, and the biaxial MEMS scanner 9 adjusts a degree of inclination of the biaxial the mirror section 9 as the infrared laser light passes through the window portion.

Support Base 32

The support base 32 is preferably formed of metal such as aluminum; however, a material of the support base 32 may be a non-metal material such as high thermal conductivity ceramics. In the case of this configuration, heat generated in the light emitting section 33 due to energy of the blue-violet laser light can be released through the support base 32.

Light Emitting Section 33

The light emitting section 33 contains phosphors which are respectively emitted as blue and yellow light so as to be excited by the blue-violet laser and emit white light. The light emitting section 33 of the embodiment is fixed on the support base 32 in a thin plate shape by sintering phosphor powder.

Next, FIG. 12A illustrates the irradiation position of the blue-violet laser light in the light emitting section 33 when being irradiated without the infrared laser light. Meanwhile, FIG. 12B is a view illustrating the irradiation position of the laser light in the light emitting section 33 when performing radiation of the infrared laser light.

As illustrated in FIG. 12B, the spot pattern can be drawn on the light emitting section 33 with the infrared laser light by the biaxial MEMS scanner 9. In addition, in the drawing, a drawing of the biaxial MEMS scanner 9 is a simple illustration schematically illustrating an image of an arrangement and an operation for simplifying the drawing.

In FIG. 12C, illustrates that a white projection pattern A' in a substantially rectangular shape overlaps a pattern S in the infrared light in a spot shape.

As illustrated in FIG. 12B, the infrared laser light is radiated onto a position s on the light emitting section 33 corresponding to a position of the pedestrian or obstacle which is detected by an on-vehicle radar, and the infrared light is projected to a desired position, thereby the pedestrian or the obstacle can be visually recognized (refer to eighth embodiment to be described later).

As illustrated in FIG. 12D, the illuminating apparatus 600 projects the white light in a distant place (projection pattern A' in a substantially rectangular shape of white light is formed), and can project a pattern S' (statue, in the drawing) in a spot shape with the infrared light so as to overlap thereto.

FIG. 12D is schematically illustrated, and a projection pattern of a headlamp of an actual vehicle may be a pattern according to a regulation. The illuminating apparatus can be a low beam, high beam, or a variable light distribution headlamp.

The projection of the spot by the infrared light which overlaps the projection of the white light may be used as a spotlight for highlighting an existence of the pedestrian or the obstacle so as to notify the driver when driving at night. In addition, when the pedestrian or the obstacle is recognized in a driving direction at night by the on-vehicle radar mounted in the vehicle, the infrared laser light is radiated to a part of the light source which is projected at the recognized position, so that infrared ray can be projected a desired position outside of the vehicle. The obstacle, or the like highlighted by the infrared ray is photographed by an infrared ray camera installed in the vehicle so that the driver can be notified of the obstacle, or the like (refer to eighth embodiment to be described later).

Seventh Embodiment

Figure 13:
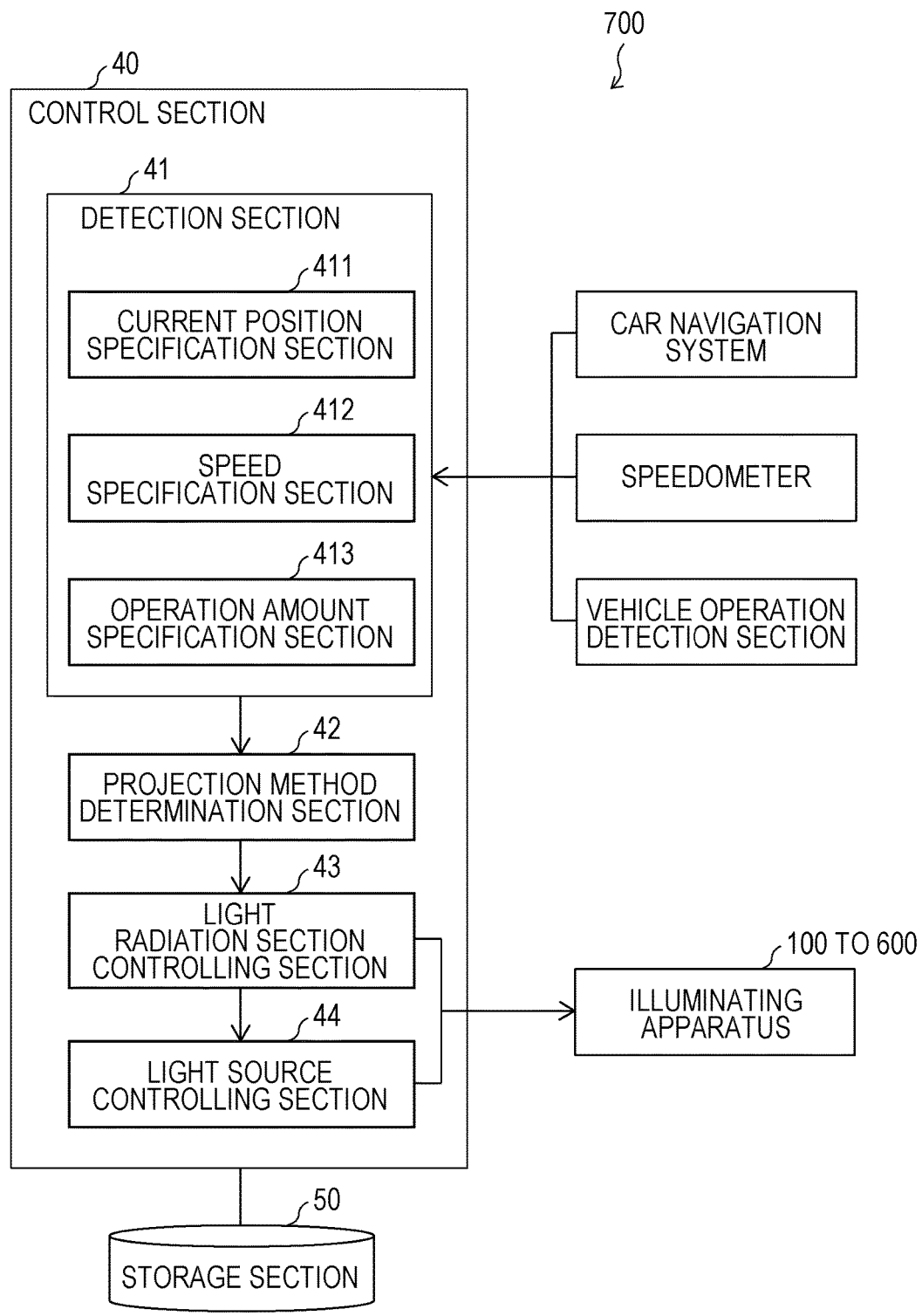
FIG. 13 is a block diagram illustrating an outline configuration of a vehicle headlamp control system according to a seventh embodiment of the disclosure.

FIG. 13 is a block diagram illustrating an outline configuration of the vehicle headlamp control system (control system) 700 according to the seventh embodiment.

In the drawing, the vehicle headlamp control system 700 includes any one of the above described illuminating apparatuses 100 to 600, a control section 40, a storage section 50, a car navigation system, a speedometer, and a vehicle operation detection section. Further, the control section 40 includes a detection section 41, a projection method determination section (lighting or non-lighting determination section) 42, a light radiation section controlling section 43, and a light source control section 44.

Detection Section 41

The detection section 41 detects a state of the vehicle or conditions on the outside of the vehicle. The detection section 41 is coupled to the car navigation system, the speedometer, and the vehicle operation detection section.

The detection section 41 further includes a current position specification section 411, a speed specification section 412, and an operation amount specification section 413.

Current Position Specification Section 411

The current position specification section 411 specifies a current position or the like on map information of the vehicle based on various map information output by the car navigation system. The car navigation system can output various map information relating to a current region, the information is as follows, such as: a road where the driver is currently driving coincides with a road which is searched for while searching for a route, is a one way road, is a narrow road where the driver has to be careful of another vehicle opposite to the vehicle, or is a road where the driver has to be careful of falling rocks.

Speed Specification Section 412

The speed specification section 412 specifies the driving speed of the vehicle using the speedometer. Operation amount specification section 413

The operation amount specification section 413 specifies, for example, an amount of operation of a handle performed by the driver according to the detected result from the vehicle operation detection section. In addition, in the embodiment, the operation amount specification section 413 specifies the amount of operation of a handle of the driver; however, it is not limited thereto, and the section may specify the amount of brake operation of the driver. For example, the operation amount specification section 413 detects the amount of operation of a handle of the driver and determines whether or not the detected amount of operation of a handle is equal to or greater than a predetermined threshold. In a case in which the amount of operation of a handle is greater than the threshold, the operation amount specification section 413 outputs a signal indicating a direction when the operation of handling is stopped to the projection method determination section 42. Projection method determination section 42

The projection method determination section 42 determines lighting or non-lighting of the second light source according to a result detected by detection section 41, or determines, by controlling the light radiating section, figures drawn by the light emitting section, a size of the figure, or the like, and a position thereof on the light emitting section.

Light Radiation Section Controlling Section 43

The light radiation section controlling section 43 controls a portion of the light radiating section such as the biaxial MEMS scanner 9 or the reflecting mirror 13 so as to control the irradiation position of the second light, size of the light spot, or the like with respect to the light emitting section.

Light Source Control Section 44

The light source control section 44, in a case in which the projection method determination section 42 determines lighting of the second light source, controls the second light to emit light by controlling the second light source. Meanwhile, in a case in which the projection method determination section 42 determines a non-lighting of the second light source, the section controls turning off the second light source when lighting, and the second light source is maintained in a state of non-lighting when not lighting.

Storage Section 50

In the storage section 50, various data, or the like for operating each control block described above are recorded.

Specific Example Using Car Navigation System

The current position specification section 411 of the detection section 41 acquires the various map information from the car navigation system and specifies a current position on the map information of the vehicle.

The projection method determination section 42 determines lighting or non-lighting of the second light source, according to the current position on the map information of the vehicle, or determines the figures drawn by the light emitting section, a size of the figure, or the like, and a position on the light emitting section by controlling the light radiating section.

For example, at the time of guiding a route by the car navigation system, a curve position to be curved "next" when reaching a destination can be output. In a case in which the curve to be approached next is a curve when the vehicle is driven in the curve, an arrow of a direction to be curved is projected to the road.

The light radiation section controlling section 43 controls the above described biaxial MEMS scanner 9 and adjusts the irradiation position of the second light with respect to the light emitting section, and for example, draws an arrow facing a specific direction on the light emitting section.

The light source control section 44 lightens the light source in a case in which the lighting of the second light source is determined by the projection method determination section 42.

According to the above configurations, by projecting a signal, or the like which communicates with and corresponds to a route guide function of the car navigation system and the map information, the information can be visually transferred to the driver who drives at night.

Specific Example Using Speedometer

The speed specification section 412 of the detection section 41 obtains a detected result of a driving speed (for example, 62 km/h) of the vehicle by the speedometer.

The projection method determination section 42, for example, determines whether or not the driving speed exceeds a speed limit and determines whether or not the second light source (for example, the second light source 7 and the second light source 22) is lightened. For example, in a case in which the driving speed of the vehicle measured by the speedometer is 62 km/h, and the limited speed is 50 km/h, the driving speed exceeds the limited speed, thereby lighting of the second light source is determined. In addition, at this time, the projection method determination section 42, for example, determines that the number 62 corresponding to the current driving speed of 62 km/h overlaps the illumination light. Meanwhile, since the driving speed is less than the limited speed in a case in which the driving speed is 40 km/h, the non-lighting of the second light source is determined. In addition, information relating to the above described limited speed, for example, may be obtained from the car navigation system, or may be obtained by analyzing an image from the on-vehicle camera (not illustrated).

The light radiation section controlling section 43 controls the above described biaxial MEMS scanner 9 and adjusts the irradiation position of the second light with respect to the light emitting section, for example, and draws the number 62 corresponding to the current driving speed 62 km/h on the light emitting section.

The light source control section 44 lightens these light sources in a case in which the lighting of the second light source is determined by the projection method determination section 42.

Specific Example Using Vehicle Operation Detection Section

The operation amount specification section 413 of the detection section 41 specifies, for example, the amount of operation of handle of the driver according to the detected result of the vehicle operation detection section. More specifically, a control signal indicating a direction where the handling is cut is output to the projection method determination section 42.

When the control signal output from the operation amount specification section 413 is obtained, with respect to the illumination light which is the white light, the projection method determination section 42 determines a projection by shifting the projection pattern of the second light in a direction where the handling is cut which is indicated by the control signal.

The light radiation section controlling section 43, for example, controls the biaxial MEMS scanner 9 illustrated in FIG. 12B and adjusts the irradiation position of the second light to the light emitting section, and controls formation of the projection pattern as illustrated in FIG. 12C.

The light source control section 44 lightens these light sources in a case in which the lighting of the second light source is determined by the projection method determination section 42.

Eighth Embodiment

Figure 14:
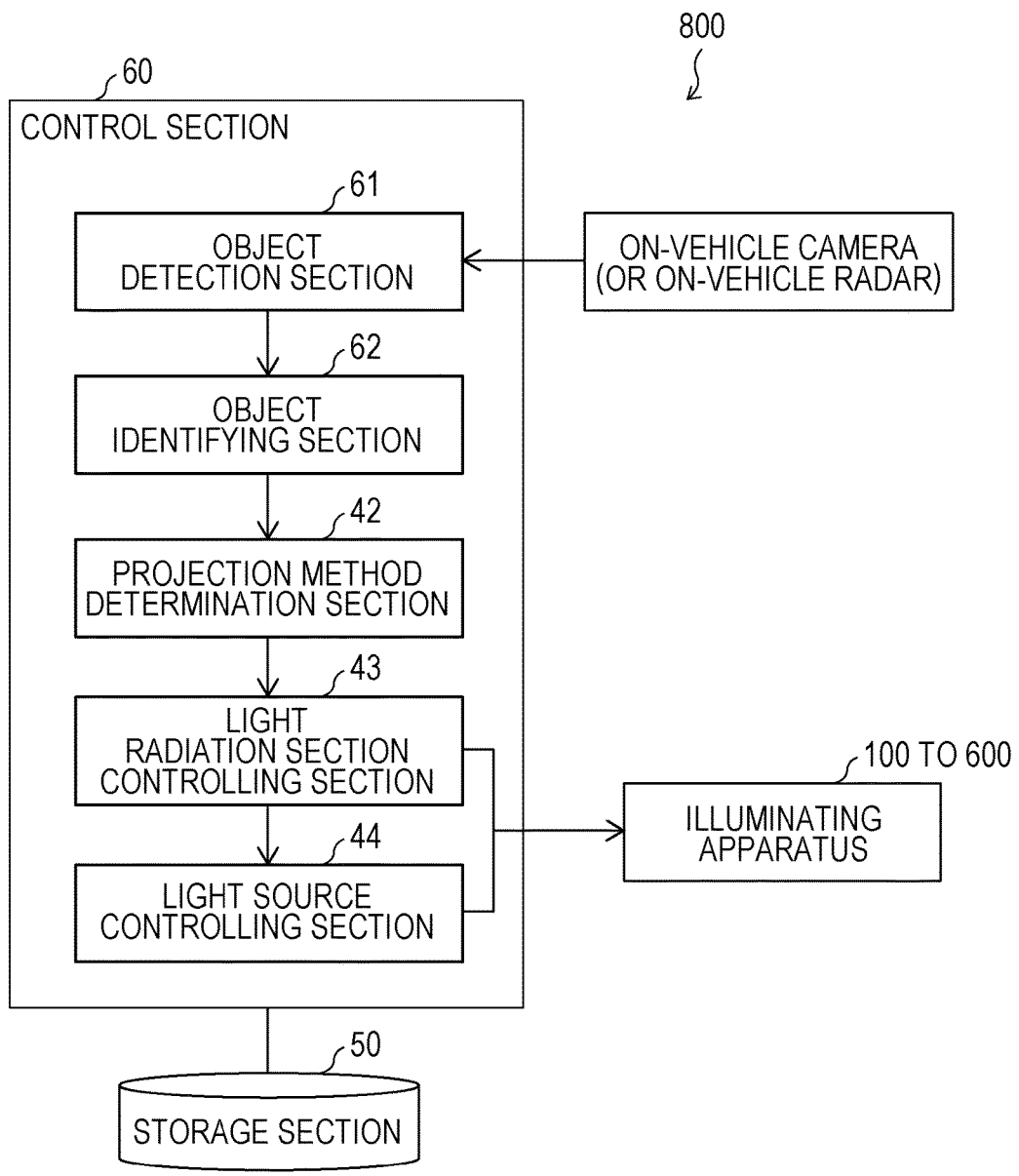
FIG. 14 is a block diagram illustrating an outline configuration of a vehicle headlamp control system according to an eighth embodiment of the disclosure.

FIG. 14 is a block diagram illustrating an outline configuration of the vehicle headlamp control system (control system) 800 according to the eighth embodiment.

As illustrated in the drawing, the vehicle headlamp control system 800 includes any one of the above described illuminating apparatuses 100 to 600, a control section 60, a storage section 50, and the on-vehicle camera (or on-vehicle radar). Further, the control section 60 includes an object detection section (detection section) 61, and an object identifying section 62, and the above described projection method determination section (lighting or non-lighting determination section) 42, the light radiation section controlling section 43, and the light source control section 44.

Object Detection Section 61

The object detection section 61 detects and analyzes a moving image photographed by the on-vehicle camera and detects an object in the moving image. Specifically, the object detection section 61, when the moving image is obtained from the on-vehicle camera, detects an object included in the projection pattern in the moving image by the vehicle.

The object detection section 61, in a case in which the object is detected in the projection pattern in the moving image, outputs a detection signal indicating a coordinate value of a region where the object is detected to an object identifying section 62.

Object Identifying Section 62

The object identifying section 62 identifies the type of the object in the coordinate value indicated by the detection signal output from the object detection section 61. Specifically, the object identifying section 62, when the detection signal is obtained from the object detection section 61, calculates a specific value that a feature point is digitalized by extracting a feature point of moving speed, a shape, or a position of the object in the coordinate value indicated by the detection signal.

The object identifying section 62 refers a reference value table which manages the reference value that a feature point is digitalized by each type of the objects, which is stored in the storage section 50, and searches for a reference value, which has a difference from the calculated feature point within a predetermined threshold in the reference value table.

For example, in the reference value table, a road sign board, the pedestrian, or an expected obstacle is registered in advance, and are managed. In a case in which the reference values which has the difference of the calculated feature value within the predetermined threshold is specified, the object identifying section 62 determines an object displayed by the reference value as an object which is detected by the object detection section 61.

In addition, the object identifying section 62, when the object detected by the object detection section 61 is determined as the object which is registered in advance, outputs the identifying signal indicating the coordinate value where the object is detected to the projection method determination section 42.

The projection method determination section 42, based on the coordinate value indicated by the identifying signal output from the object identifying section 62, determines the irradiation position, or the like of the second light in the light emitting section so that the light from the light emitting section is distributed toward the object. Specifically, the projection method determination section 42 causes the light radiation section controlling section 43 to control the irradiation position of the second light in the light emitting section by changing a degree of an incline, or the like of the biaxial MEMS scanner 9 so that the light from the light emitting section is distributed toward the object.

The light radiation section controlling section 43, for example, controls the biaxial MEMS scanner 9 as illustrated in FIG. 12B and adjusts the irradiation position of the second light on the light emitting section, thereby controlling the irradiation position to be formed as illustrated in FIG. 12C.

The light source control section 44 lightens these light sources in a case in which the lighting of the second light source is determined by the projection method determination section 42.

Conclusion

The illuminating apparatus relating to the first embodiment of the disclosure is configured to include the first light source (4) that emits the first light, the light emitting section (1) that emits light by being irradiated with the first light, the second light source (7) that emits second light which is visible light or infrared light having a different spectrum from the emission spectrum of light emitted from the light emitting section by being irradiated with the first light (here, "different spectrum" means that a spectrum is different from the spectrum of the emitted light), the light radiating section (biaxial MEMS scanner 9) that irradiates a part of the light emitting section with the second light, and the light projection section (convex lens 10) that projects the light which is emitted from the light emitting section by being irradiated with the first light and light which is emitted from the light emitting section by being irradiated with the second light to the outside.

According to the configuration, the second light is radiated to a part of the light emitting section emitting light by being irradiated with the first light. In addition, the light projection section projects the light emitted from the light emitting section by being irradiated with the first light and the light emitted from the light emitting section by being irradiated with the second light to the outside. For this reason, the light emitted from the light emitting section by being irradiated with the second light to the outside is projected to a part of a region to which the light emitted from the light emitting section by being irradiated with the first light is projected. For this reason, information due to the second light can be loaded in the illumination light by the light emitted from the light emitting section by being irradiated with the first light. In addition, the second light is the visible light or the infrared light having different spectrum from the emission spectrum of light emitted from the light emitting section by being irradiated with the first light. For this reason, the visibility of the information loaded in the illumination light can be improved.

In the illuminating apparatus relating to the second embodiment of the disclosure, in the first embodiment, the light radiating section may irradiate a surface of a side where the light emitted from the light emitting section by being irradiated with the first light is mainly taken out with the second light. According to the configuration, the light emitting pattern can be generated in which an image due to the second light overlaps a part of the illumination light by the light emitted from the light emitting section by being irradiated with the first light. For this reason, the projection pattern in which the image due to the second light overlaps a part of the illumination light can be projected to the outside.

In the illuminating apparatus relating to the third embodiment of the disclosure, in the first or second embodiment, the light projection section may be an optical system that images a light emitting pattern which is a pattern of a distribution of an emission intensity of the light emitting section as a projection pattern which is a pattern of a distribution of an emission intensity of the light projected to the outside. According to the configuration, the projection pattern in which the image due to the second light overlaps a part of the illumination light can be imaged in the outside.

In the illuminating apparatus relating to the fourth embodiment of the disclosure, in any one of the first to third embodiments, the light projection section may include a convex lens. According to the configuration, the projection pattern in which the image by the second light overlaps a part of the illumination light can be imaged in the outside.

In the illuminating apparatus relating to the fifth embodiment, in any one of the first to fourth embodiments, a shape of a main surface of the light emitting section may be a rectangle. According to the configuration, by irradiating the main surface of the light emitting section with light, according to a shape of the main surface of the light emitting section, the projection pattern of the illumination light in a rectangular shape can be projected to the outside. In addition, the main surface of the light emitting section is a side surface having the largest area in the light emitting section.

In the illuminating apparatus relating to the sixth embodiment of the disclosure, in any one of the first to fourth embodiments, a shape of a main surface of the light emitting section may be a right-left asymmetrical shape. According to the configuration, by emitting light to the main surface of the light emitting section, according to a shape of the main surface of the light emitting section, the projection pattern of the illumination light in a right-left asymmetrical shape can be projected to the outside.

In the illuminating apparatus relating to the seventh embodiment of the disclosure, in any one of the first to sixth embodiments, the light emitting section may contain a phosphor excited by the first light. According to the configuration, the fluorescence which is excited by the first light is possible to be emitted from the light emitting section.

In the illuminating apparatus relating to the eighth embodiment of the disclosure, in the seventh embodiment, the second light may be light which does not contribute to excitation of the phosphor. According to the configuration, the light which does not contribute to the excitation of the phosphor can be scattered by the light emitting section.

In the illuminating apparatus relating to the ninth embodiment of the disclosure, in the seventh or eighth embodiment, a distribution of the first light on the light emitting section may be formed by imaging a near field pattern which is an image of the first light generated in the emitting end surface of the light guide member disposed between the first light source and the light emitting section on the light emitting section. According to the configuration, the first light can be radiated onto the light emitting section in a uniform distribution corresponding to the emitting end surface of the light guide member.

In the illuminating apparatus relating to the tenth embodiment of the disclosure, in any one of the first to sixth embodiments, the first light may include light having colors of various types, and the light emitting section may emit light by scattering the light having colors of the various types. According to the configuration, with respect to the illumination light generated by scattering the light beams having colors of various types as the first light, the image due to the second light can be overlapped.

In the illuminating apparatus relating to the eleventh embodiment of the disclosure, in the tenth embodiment, the light emitting section may include a diffusion plate, and the light having colors of the various types may be scattered by being radiated to the diffusion plate. According to the configuration, with respect to the illumination light generated by scattering the light beams having colors of various types as the first light, the image due to the second light can be overlapped.

The illuminating apparatus relating to the twelfth embodiment of the disclosure, in the tenth embodiment or the eleventh embodiment, a distribution of the light having colors of the various types on the light emitting section may be formed by imaging a near field pattern which is an image of the first light generated in the emitting end surface of the light guide member disposed between the first light source and the light emitting section on the light emitting section. According to the configuration, each of light of colors of various types as the first light can be radiated onto the light emitting section in a uniform distribution corresponding to the emitting end surface of the light guide member.

In the illuminating apparatus relating to a thirteenth embodiment of the disclosure, in any one of the first to sixth embodiments, the first light source is a light emitting diode, and the light emitting section may contain a phosphor which is excited by the first light emitted from the light emitting diode. According to the configuration, the light emitting pattern can be generated in which the image due to the second light overlaps on a part of the fluorescence excited by the light emitting diode as an excitation light source.

In the illuminating apparatus relating to a fourteenth embodiment of the disclosure, in any one of the first to thirteenth embodiments, the light radiating section may radiate the second light so as to scan the surface of the light emitting section. According to the configuration, for example, the light emitting pattern can be generated in which a letter or a figure due to the second light overlaps a part of the illumination light.

In the illuminating apparatus relating to a fifteenth embodiment of the disclosure, in any one of the first to thirteenth embodiments, the light radiating section may enlarge a light spot of the second light and irradiate the surface of the light emitting section with the enlarged light spot. According to the configuration, for example, the light emitting pattern can be generated in which the light spot due to the second light overlaps a part of the illumination light.

In the illuminating apparatus relating to a sixteenth embodiment of the disclosure, in any one of the first to fifteenth embodiments, the projection pattern which is an intensity distribution of the light projected to the outside may be a pattern in which the light emitted from the light emitting section by being irradiated with the second light is projected to a part of a region where the light emitted from the light emitting section by being irradiated with the first light is projected. According to the configuration, the projection pattern in which the image due to the second light overlaps a part of the illumination light can be generated.

In the illuminating apparatus relating to a seventeenth embodiment of the disclosure, in any one of the first to fourteenth embodiments, a figure may be formed as a projection pattern which is a pattern of an intensity distribution of the light emitted from the light emitting section by being irradiated with the second light and projected to the outside. According to the configuration, the projection pattern in which the figure by the second light overlaps a part of the illumination light can be generated.

In the illuminating apparatus relating to an eighteenth embodiment of the disclosure, in any one of the first to fourteenth embodiments, the second light source may intermittently emit the second light. According to the configuration, the image due to the second light overlapping a part of the illumination light can be blinked.

The vehicle headlamp relating to a nineteenth embodiment of the disclosure may include the illuminating apparatus in any one of first to eighteenth embodiments. According to the configuration, the vehicle headlamp capable of improving visibility of the information loaded in the illumination light is realized.

A control system of a vehicle headlamp relating to a twentieth embodiment of the disclosure includes the vehicle headlamp which is disclosed in the nineteenth embodiment and a control section that controls an operation of the vehicle headlamp. The control section includes a detection section that detects a state of the vehicle or conditions outside of the vehicle, a lighting or non-lighting determination section that determines whether or not the second light is lightened in response to the state of the vehicle or the condition of the vehicle detected by the detection section, and a light source control section that controls lighting or non-lighting of the second light source based on a result determined in the lighting or non-lighting determination section. According to the configuration, lighting or non-lighting of the second light source can be controlled in response to the state of the vehicle or the conditions outside of the vehicle. As the state of the vehicle, for example, a state of operation of a handle or a state of driving speed of the vehicle by the speedometer is exemplified. In addition, as the conditions outside of the vehicle, for example, weather conditions outside of the vehicle, and conditions near a current position of the vehicle determined by the car navigation system are exemplified.

Other Description of Disclosure

The disclosure can be described as follows.

That is, the illuminating apparatus of the disclosure is an illuminating apparatus that includes a light emitting section emitting white light and a light projection section, and may have a configuration in which visible light (single color other than white) or first laser light of infrared light is radiated to a "part" of the light emitting section.

In addition, in the illuminating apparatus of the disclosure, in the illuminating apparatus, the first laser may be radiated to a surface where the white light from the light emitting section is mainly taken out to the outside, in the light emitting section.

In addition, in the illuminating apparatus of the disclosure, in the illuminating apparatus, the light projection section may be an optical system that images the light emitting pattern of the light emitting section on the outside.

In addition, in the illuminating apparatus of the disclosure, in the illuminating apparatus, the optical system may be a convex lens.

In addition, in the illuminating apparatus of the disclosure, in the illuminating apparatus, the light emitting section may be a rectangular shape.

In addition, in the illuminating apparatus of the disclosure, in the illuminating apparatus, the light emitting section may be irradiated with light in a right-left asymmetrical shape (shape corresponding to a low beam).

In addition, in the illuminating apparatus of the disclosure, in the illuminating apparatus, the light emitting section may contain the phosphor which is excited by the second laser light for excitation.

In addition, in the illuminating apparatus of the disclosure, in the illuminating apparatus, the first laser light may be a laser light having a wavelength which is not absorbed by the phosphor.

In addition, in the illuminating apparatus of the disclosure, in the illuminating apparatus, the distribution of the second laser light on the light emitting section may image the near field pattern of the output surface of the light guide member on the light emitting section.

In addition, in the illuminating apparatus of the disclosure, in the illuminating apparatus, the light emitting section may scatter a third laser light which is the visible light.

In addition, in the illuminating apparatus of the disclosure, in the illuminating apparatus, the third laser light is scattered by being radiated to a diffusion plate made of metal.

In addition, in the illuminating apparatus of the disclosure, in the illuminating apparatus, a distribution of the third laser light on the light emitting section may be formed by imaging the near field pattern of the output surface of the light guide member on the light emitting section.

In addition, in the illuminating apparatus of the disclosure, in the illuminating apparatus, the light emitting section may include the light emitting diode and a portion where the phosphor is excited by the light emitting diode.

In addition, in the illuminating apparatus of the disclosure, in the illuminating apparatus, the surface of the light emitting section may be scanned with the first laser light.

In addition, in the illuminating apparatus of the disclosure, in the illuminating apparatus, the first laser light may be enlarged and projected on the surface of the light emitting section.

In addition, the vehicle headlamp of the disclosure may include any one of the illuminating apparatuses described above.

In addition, the vehicle headlamp of the disclosure may project the visible light or the infrared light on a part of a portion illuminated with the white light in the vehicle headlamp.

In addition, a subject to be projected by the vehicle headlamp of the disclosure may be the figure (line, arrow, number, and the like) in the vehicle headlamp.

In addition, the vehicle headlamp of the disclosure may turn on and off the visible light or the infrared light independently from the white light, in the vehicle headlamp.

In addition, the vehicle headlamp of the disclosure, may project the figure (arrow, number, or the like) on a part of the portion illuminated with the white light with the visible light or the infrared light based on the signal (navigation system, speedometer, or the like) from the vehicle.

In addition, the vehicle headlamp of the disclosure, may detect conditions outside of the vehicle by the on-vehicle camera and project the visible light or the infrared light on a part of the portion illuminated with the white light based on the detected result.

Supplementary Note

The present disclosure is not limited to each of the above described embodiments and is capable of being changed variously within a range suggested in claims, and an embodiment obtained by appropriately combining technical devices respectively disclosed in other embodiments is also included in a technical range of the disclosure. Further, each of the technical devices disclosed in each embodiment are combined with each other so as to form a new technical feature.

The present disclosure can be used in the illuminating apparatus that projects the light emitted from the light emitting section to the outside and the vehicle headlamp including the illuminating apparatus.

The present disclosure contains subject matter related to that disclosed in Japanese Priority Patent Application JP 2014-133302 filed in the Japan Patent Office on Jun. 27, 2014, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An illuminating apparatus comprising:
   a first light source that emits a first light;
   a light emitter that contains a phosphor and emits light after being irradiated with the first light that excites the phosphor;
   a second light source that does not contribute to excitation of the phosphor and emits a second light which is infrared light or visible light having a different spectrum from an emission spectrum of the light emitted from the light emitter;
   a light irradiator that irradiates a portion of the light emitter with the second light; and
   a light projector that projects the first light and the second light which is emitted from the light emitter, wherein
   the second light source projects information or a function different from the first light source,
   the information includes at least one of a figure, a letter, a symbol, and a warning, and
   the function includes at least one of projecting any size of a spot as a warning, and changing a color temperature of an area of the first light.

2. The illuminating apparatus according to claim 1, wherein the light irradiator irradiates a surface of the light emitter where a majority of the first light is emitted.

3. The illuminating apparatus according to claim 1, wherein the light projector is an optical system that images a light emitting pattern to the outside.

4. The illuminating apparatus according to claim 1, wherein the light projector includes a convex lens.

5. The illuminating apparatus according to claim 1, wherein a shape of a main surface of the light emitter is a rectangle.

6. The illuminating apparatus according to claim 1, wherein a shape of a main surface of the light emitter is asymmetrical.

7. The illuminating apparatus according to claim 1, further comprising a light guide between the first light source and the light emitter,
   wherein a distribution of the first light on the light emitter is an image of the first light emitted by the light guide.

8. The illuminating apparatus according to claim 1, wherein
   the first light includes various colors, and
   the light emitter emits light by scattering the first light.

9. The illuminating apparatus according to claim 8, wherein
   the light emitter includes a diffusion plate, and
   the first light is scattered by being irradiated on the diffusion plate.

10. The illuminating apparatus according to claim 8, further comprising a light guide between the first light source and the light emitter,
    wherein a distribution of the first light on the light emitter is an image of the first light emitted by the light guide.

11. The illuminating apparatus according to claim 1, wherein
    the first light source is a light emitting diode, and
    the light emitter contains a phosphor excited by the first light.

12. The illuminating apparatus according to claim 1, wherein the light irradiator irradiates the second light by scanning a surface of the light emitter, and the light irradiator includes a microelectromechanical system (MEMS), a galvanometer, or a polygon mirror.

13. The illuminating apparatus according to claim 1, wherein
    the second light includes a spot shape, and
    the light irradiator enlarges the light spot.

14. The illuminating apparatus according to claim 1, wherein a projection pattern projected to the outside from the light emitter includes a first irradiation pattern from the first light and a second irradiation pattern from the second light.

15. The illuminating apparatus according to claim 1, wherein a figure is projected from the light emitter after being irradiated with the second light.

16. The illuminating apparatus according to claim 1, wherein the second light source intermittently emits the second light.

17. A vehicle headlamp comprising:
    a first light source that emits a first light;
    a light emitter that contains a phosphor and emits light after being irradiated with the first light that excites the phosphor;
    a second light source that does not contribute to excitation of the phosphor and emits a second light which is infrared light or visible light having a different spectrum from an emission spectrum of the light emitted from the light emitter;
    a light irradiator that irradiates a portion of the light emitter with the second light; and
    a light projector that projects the first light and the second light which is emitted from the light emitter, wherein
    the second light source projects information or a function different from the first light source, the information includes at least one of a figure, a letter, a symbol, and a warning, and the function includes at least one of projecting any size of a spot as a warning, and changing a color temperature of an area of the first light.

18. A control system of a vehicle headlamp comprising:
a vehicle headlamp including:
  a first light source that emits a first light;
  a light emitter that contains a phosphor and emits light after being irradiated with the first light that excites the phosphor;
  a second light source that does not contribute to excitation of the phosphor and emits a second light which is infrared light or visible light having a different spectrum from an emission spectrum of the light emitted from the light emitter;
  a light irradiator that irradiates a portion of the light emitter with the second light; and
  a light projector that projects the first light and the second light which is emitted from the light emitter; and
a controller that controls an operation of the vehicle headlamp,
wherein the controller includes:
  a detector that detects a state of a vehicle or conditions outside of the vehicle,
  a lighting or non-lighting determiner that determines whether or not the second light is lighted according to the state of the vehicle or the conditions outside of the vehicle detected by the detector, and
  a light source controller that controls lighting or non-lighting of the second light source based on a result determined in the lighting or non-lighting determiner.

19. An illuminating apparatus comprising:
a first light source that emits a first light;
a light emitter that contains a phosphor and emits light after being irradiated with the first light that excites the phosphor;
a second light source that does not contribute to excitation of the phosphor and emits a second light which is infrared light and visible light having a different spectrum from an emission spectrum of the light emitted from the light emitter;
a light irradiator that irradiates a portion of the light emitter with the second light; and
a light projector that projects the first light and the second light which is emitted from the light emitter, wherein
the second light source projects information and a function different from the first light source,
the information includes at least one of a figure, a letter, a symbol, and a warning, and
the function includes at least one of projecting any size of a spot as a warning, and changing a color temperature of an area of the first light.

20. An illuminating apparatus comprising:
a first light source that emits first light;
a light emitter that contains a phosphor and emits light after being irradiated with the first light that excites the phosphor;
a second light source that does not contribute to excitation of the phosphor and emits a second light which is infrared light or visible light having a different spectrum from an emission spectrum of the light emitted from the light emitter;
a light irradiator that irradiates a portion of the light emitter with the second light;
a light projector that projects the first light and the second light, which are emitted from the light emitter; and
a detector that detects a condition outside of the vehicle, wherein
the second light source projects a figure, a letter, or a symbol according to the condition detected by the detector.

* * * * *